United States Patent
Lei et al.

(10) Patent No.: US 12,414,121 B2
(45) Date of Patent: Sep. 9, 2025

(54) LATENCY REDUCTION AND COVERAGE ENHANCEMENT FOR EXTENDED REALITY

(71) Applicant: QUALCOMM Incorporated, San Diego, CA (US)

(72) Inventors: Jing Lei, San Diego, CA (US); Yuchul Kim, San Diego, CA (US); Hwan Joon Kwon, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/495,326

(22) Filed: Oct. 26, 2023

(65) Prior Publication Data

US 2024/0057092 A1 Feb. 15, 2024

Related U.S. Application Data

(63) Continuation of application No. 17/143,065, filed on Jan. 6, 2021, now Pat. No. 12,200,705.

(51) Int. Cl.
*H04W 72/21* (2023.01)
*H04W 72/0446* (2023.01)
*H04W 72/0453* (2023.01)

(52) U.S. Cl.
CPC ....... *H04W 72/21* (2023.01); *H04W 72/0446* (2013.01); *H04W 72/0453* (2013.01)

(58) Field of Classification Search
CPC ............. H04W 72/21; H04W 72/0446; H04W 72/0453; H04W 72/23
See application file for complete search history.

(56) References Cited

U.S. PATENT DOCUMENTS 10,972,987 B2  4/2021  Akkarakaran et al.
2007/0237217 A1* 10/2007 Shen ............... H04L 1/0003
                                                      375/259

(Continued)

FOREIGN PATENT DOCUMENTS

WO  WO2020165835 A1  8/2020
WO  WO2020244393 A1  12/2020

OTHER PUBLICATIONS

CATT: "Concurrent Transmission of Uplink Signals on PUCCH in Rel-10", 3GPP Draft, 3GPP TSG RAN WG1 Meeting #63bis, R1-110040, 3rd Generation Partnership Project (3GPP), Mobile Competence Centre, 650, Route Des Lucioles, F-06921 Sophia-Antipolis Cedex, France, vol. RAN WG1, No. Dublin, Ireland, Jan. 17, 2011, Jan. 11, 2011 (Jan. 11, 2011), XP050474310, 3 Pages, [Retrieved on Jan. 11, 2011] Config 10, table 1.

(Continued)

*Primary Examiner* — Ayaz R Sheikh
*Assistant Examiner* — Tarell A Hampton
(74) *Attorney, Agent, or Firm* — Holland & Hart LLP

(57) ABSTRACT

Methods, systems, and devices for wireless communications are described. A user equipment (UE) may identify a resource for a joint uplink transmission comprising a sounding reference signal and a scheduling request. The UE may receive a grant of a set of resources for an uplink data transmission to a base station. The UE may perform the joint uplink transmission comprising the sounding reference signal and the scheduling request using the resource for the joint uplink transmission in connection with performing the uplink data transmission using the set of resources for the uplink.

15 Claims, 19 Drawing Sheets

(56) References Cited

U.S. PATENT DOCUMENTS

| | | |
|---|---|---|
| 2008/0117891 A1* | 5/2008 | Damnjanovic ....... H04W 72/04 370/345 |
| 2008/0316959 A1 | 12/2008 | Bachl et al. |
| 2010/0329220 A1* | 12/2010 | Kim ...................... H04W 72/23 370/336 |
| 2011/0085516 A1 | 4/2011 | Pajukoski et al. |
| 2011/0092240 A1 | 4/2011 | Aiba et al. |
| 2011/0141928 A1* | 6/2011 | Shin ...................... H04L 1/0028 370/252 |
| 2011/0205981 A1 | 8/2011 | Koo et al. |
| 2012/0028628 A1* | 2/2012 | Frenger ................ H04L 1/0031 455/422.1 |
| 2012/0182944 A1* | 7/2012 | Sorrentino ............ H04L 5/0044 370/329 |
| 2012/0213195 A1 | 8/2012 | Lunttila et al. |
| 2012/0300724 A1* | 11/2012 | Liu ...................... H04W 72/23 370/329 |
| 2012/0307775 A1* | 12/2012 | Chung .................. H04L 1/1671 370/329 |
| 2012/0320852 A1* | 12/2012 | Seo ...................... H04L 1/0041 370/329 |
| 2013/0021898 A1* | 1/2013 | Kang ................... H04B 7/0417 370/216 |
| 2014/0071909 A1* | 3/2014 | Frenne ................. H04W 72/20 370/329 |
| 2017/0013565 A1 | 1/2017 | Pelletier et al. |
| 2018/0034606 A1* | 2/2018 | Ahn ...................... H04B 7/0617 |
| 2018/0124755 A1 | 5/2018 | Huang et al. |
| 2018/0146439 A1 | 5/2018 | Kim et al. |
| 2018/0206271 A1 | 7/2018 | Chatterjee et al. |
| 2018/0295651 A1 | 10/2018 | Cao et al. |
| 2018/0331807 A1 | 11/2018 | Kim et al. |
| 2019/0029046 A1 | 1/2019 | Li et al. |
| 2019/0053319 A1 | 2/2019 | Jeon et al. |
| 2019/0075492 A1* | 3/2019 | Suzuki .................... H04L 5/001 |
| 2019/0104532 A1 | 4/2019 | Park et al. |
| 2019/0190663 A1 | 6/2019 | Sahlin et al. |
| 2019/0222364 A1 | 7/2019 | Shimoda et al. |
| 2019/0280757 A1 | 9/2019 | Yang et al. |
| 2019/0349779 A1 | 11/2019 | Li et al. |
| 2019/0363843 A1 | 11/2019 | Gordaychik |
| 2019/0364592 A1 | 11/2019 | Bhattad et al. |
| 2020/0053750 A1 | 2/2020 | Vos |
| 2020/0059899 A1 | 2/2020 | Takeda et al. |
| 2020/0068535 A1 | 2/2020 | Wang et al. |
| 2020/0107396 A1 | 4/2020 | Wang et al. |
| 2020/0229155 A1 | 7/2020 | Chien et al. |
| 2020/0314817 A1 | 10/2020 | Sun et al. |
| 2020/0389885 A1* | 12/2020 | Tomeba ................ H04W 72/21 |
| 2020/0404677 A1 | 12/2020 | Hua et al. |
| 2021/0045110 A1 | 2/2021 | Olsson et al. |
| 2021/0068130 A1 | 3/2021 | Liu et al. |
| 2021/0168768 A1 | 6/2021 | Bae et al. |
| 2021/0274536 A1 | 9/2021 | Shin et al. |
| 2021/0306121 A1 | 9/2021 | Froberg et al. |
| 2021/0345385 A1 | 11/2021 | Karaki et al. |
| 2021/0368534 A1 | 11/2021 | Sato et al. |
| 2022/0070896 A1* | 3/2022 | Wong .................... H04W 72/21 |
| 2022/0095389 A1 | 3/2022 | Chen et al. |
| 2022/0159677 A1 | 5/2022 | Hwang et al. |
| 2022/0217713 A1 | 7/2022 | Lei et al. |
| 2022/0271886 A1 | 8/2022 | He et al. |
| 2022/0312459 A1 | 9/2022 | Yang et al. |

OTHER PUBLICATIONS

International Search Report and Written Opinion—PCT/US2021/065633—ISA/EPO—May 3, 2022.

\* cited by examiner

| Coverage Enhancements for PUSCH (Repetition, Frequency Hopping, DMRS Bundling, etc.) | | | Coverage Enhancements for PUCCH (Repetition, Frequency Hopping, DMRS Bundling, etc.) | | | Coverage Enhancements for SRS (Repetition, Frequency Hopping, DMRS Bundling, etc.) | | |
|---|---|---|---|---|---|---|---|---|
| PUSCH | --- | PUSCH | PUCCH | --- | PUCCH | SRS | --- | SRS |
| 405-a | | 405-m | 410-a | | 410-n | 415-a | | 415-o |

LATENCY REDUCTION AND COVERAGE ENHANCEMENT FOR EXTENDED REALITY

CROSS REFERENCE

The present Application for Patent is a Continuation of U.S. patent application Ser. No. 17/143,065 by LEI et al., entitled "LATENCY REDUCTION AND COVERAGE ENHANCEMENT FOR EXTENDED REALITY" filed Jan. 6, 2021, assigned to the assignee hereof, and expressly incorporated by reference in its entirety herein.

FIELD OF TECHNOLOGY

The following relates to wireless communications, including latency reduction and coverage enhancement for extended reality.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support latency reduction and coverage enhancement for extended reality (XR). Generally, the described techniques provide for various techniques to decrease latency of extended uplink traffic and provide coverage enhancements, such as in an XR scenario.

In some aspects, this may include a joint transmission of a scheduling request (SR)/buffer status report (BSR) (which may be collectively referred to as SR for simplicity) and a sounding reference signal (SRS). The SRS may be used to add channel performance determination at the transmitting device, which will improve resource allocation, configuration, for the subsequent uplink transmission(s). The joint transmission may be separate from a corresponding uplink data transmission (such as a physical uplink shared channel (PUSCH) transmission). For example, the SR/BSR and SRS may be transmitted back-to-back with the PUSCH transmission. In another example, the SR/BSR may be multiplexed into the PUSCH transmission with the SRS transmitted afterwards. In yet another example, the SRS transmission may use specific root or cyclic shifts to implicitly indicate the SR/BSR. Accordingly, a user equipment (UE) may perform the joint uplink transmission (e.g., the SRS/SR transmission) and the PUSCH transmission.

In some aspects, this may include using transport block size (TBS) scaling and optimizations using a joint slot aggregation factor/TBS scaling indication. The TBS scaling parameter may be indicated implicitly (e.g., may be a function of the explicitly indicated slot aggregation factor) or explicitly (e.g., may map the slot aggregation factor to subfield of the downlink control information (DCI)). The slot aggregation factor may be indicated implicitly (e.g., may be a function of the explicitly indicated TBS scaling factor) or explicitly (e.g., may map a TBS scaling factor to a specific subfield of the DCI). Accordingly, the UE may perform a PUSCH transmission using TBS scaling (e.g., based on a TBS scaler) to the base station.

In some aspects, this may include using multiple-transport block scheduling for semi-persistent resources (e.g., configured grant (CG) and/or proactive grant (PG) resources). In one example, radio resource control (RRC) signaling may be used for resource allocation/modulation coding scheme (MCS) indication during the CG/PG configuration. In this example, the DCI grant may then trigger the multi-TB transmission using the CG/PG resources. In another example, the DCI activating the CG/PG resources may configure the multi-TB transmission. Accordingly, the UE may perform the PUSCH transmission using multiple transport blocks to the base station.

A method for wireless communication at a user equipment (UE) is described. The method may include identifying a resource for a joint uplink transmission including a SRS and a SR, receiving a grant of a set of resources for an uplink data transmission to a base station, and performing the joint uplink transmission including the SRS and the SR using the resource for the joint uplink transmission in connection with performing the uplink data transmission using the set of resources for the uplink data transmission.

An apparatus for wireless communication at a UE is described. The apparatus may include a processor, memory in electronic communication with the processor, and instructions stored in the memory. The instructions may be executable by the processor to cause the apparatus to identify a resource for a joint uplink transmission including a SRS and a SR, receive a grant of a set of resources for an uplink data transmission to a base station, and perform the joint uplink transmission including the SRS and the SR using the resource for the joint uplink transmission in connection with performing the uplink data transmission using the set of resources for the uplink data transmission.

Another apparatus for wireless communication at a UE is described. The apparatus may include means for identifying a resource for a joint uplink transmission including a SRS and a SR, means for receiving a grant of a set of resources for an uplink data transmission to a base station, and means for performing the joint uplink transmission including the SRS and the SR using the resource for the joint uplink transmission in connection with performing the uplink data transmission using the set of resources for the uplink data transmission.

A non-transitory computer-readable medium storing code for wireless communication at a UE is described. The code may include instructions executable by a processor to identify a resource for a joint uplink transmission including a SRS and a SR, receive a grant of a set of resources for an uplink data transmission to a base station, and perform the joint uplink transmission including the SRS and the SR using the resource for the joint uplink transmission in connection with performing the uplink data transmission using the set of resources for the uplink data transmission.

In some examples of the method, apparatuses, and non-transitory computer-readable medium described herein, performing the uplink data transmission and the joint uplink transmission may include operations, features, means, or instructions for transmitting the uplink data transmission and the joint uplink transmission back-to-back according to a TDM technique and using one or more subcarriers.

In some examples of the method, apparatuses, and non-transitory computer-readable medium described herein, performing the uplink data transmission and the joint uplink transmission may include operations, features, means, or instructions for multiplexing the uplink data transmission with the SR to obtain a multiplexed uplink transmission and transmitting the multiplexed uplink transmission and the SRS back-to-back according to a TDM technique and using one or more subcarriers.

In some examples of the method, apparatuses, and non-transitory computer-readable medium described herein, performing the uplink data transmission and the joint uplink transmission may include operations, features, means, or instructions for applying a root sequence, a cyclic shift, or both, for the SRS, where the root sequence, the cyclic shift, or both, indicates the SR and transmitting the uplink data transmission and the SRS back-to-back according to a TDM technique and using one or more subcarriers.

Some examples of the method, apparatuses, and non-transitory computer-readable medium described herein may further include operations, features, means, or instructions for identifying at least one of a repetition pattern, a frequency hopping pattern, a demodulation reference signal (DMRS) bundling, or a combination thereof, where the uplink data transmission, the joint uplink transmission, or both, may be transmitted according to the repetition pattern, the frequency hopping pattern, the DMRS bundling, or a combination thereof.

Some examples of the method, apparatuses, and non-transitory computer-readable medium described herein may further include operations, features, means, or instructions for receiving a signal indicating the resource for the joint uplink transmission.

In some examples of the method, apparatuses, and non-transitory computer-readable medium described herein, the signal includes at least one of the grant, a RRC signal, a medium access control (MAC) control element (CE), a DCI, or a combination thereof.

A method for wireless communication at a base station is described. The method may include identifying a resource for a joint uplink transmission including a SRS and a SR, transmitting a grant of a set of resources for an uplink data transmission from a UE, and performing the joint uplink transmission including the SRS and the SR using the resource for the joint uplink transmission in connection with performing the uplink data transmission using the set of resources for the uplink data transmission.

An apparatus for wireless communication at a base station is described. The apparatus may include a processor, memory in electronic communication with the processor, and instructions stored in the memory. The instructions may be executable by the processor to cause the apparatus to identify a resource for a joint uplink transmission including a SRS and a SR, transmit a grant of a set of resources for an uplink data transmission from a UE, and perform the joint uplink transmission including the SRS and the SR using the resource for the joint uplink transmission in connection with performing the uplink data transmission using the set of resources for the uplink data transmission.

Another apparatus for wireless communication at a base station is described. The apparatus may include means for identifying a resource for a joint uplink transmission including a SRS and a SR, means for transmitting a grant of a set of resources for an uplink data transmission from a UE, and means for performing the joint uplink transmission including the SRS and the SR using the resource for the joint uplink transmission in connection with performing the uplink data transmission using the set of resources for the uplink data transmission.

A non-transitory computer-readable medium storing code for wireless communication at a base station is described. The code may include instructions executable by a processor to identify a resource for a joint uplink transmission including a SRS and a SR, transmit a grant of a set of resources for an uplink data transmission from a UE, and perform the joint uplink transmission including the SRS and the SR using the resource for the joint uplink transmission in connection with performing the uplink data transmission using the set of resources for the uplink data transmission.

In some examples of the method, apparatuses, and non-transitory computer-readable medium described herein, performing the uplink data transmission and the joint uplink transmission may include operations, features, means, or instructions for receiving the uplink data transmission and the joint uplink transmission back-to-back according to a TDM technique and using one or more subcarriers.

In some examples of the method, apparatuses, and non-transitory computer-readable medium described herein, performing the uplink data transmission and the joint uplink transmission may include operations, features, means, or instructions for receiving a multiplexed uplink transmission and the SRS back-to-back according to a TDM technique and using one or more subcarriers, the multiplexed uplink transmission including the uplink data transmission multiplexed with the SR.

In some examples of the method, apparatuses, and non-transitory computer-readable medium described herein, performing the uplink data transmission and the joint uplink transmission may include operations, features, means, or instructions for receiving the uplink data transmission and the SRS back-to-back according to a TDM technique and using one or more subcarriers and identifying the SR based on a root sequence, a cyclic shift, or both, applied to the SRS.

Some examples of the method, apparatuses, and non-transitory computer-readable medium described herein may further include operations, features, means, or instructions for identifying at least one of a repetition pattern, a frequency hopping pattern, a DMRS bundling, or a combination thereof, where the uplink data transmission, the joint uplink transmission, or both, may be received according to the repetition pattern, the frequency hopping pattern, the DMRS bundling, or a combination thereof.

Some examples of the method, apparatuses, and non-transitory computer-readable medium described herein may further include operations, features, means, or instructions for transmitting a signal indicating the resource for the joint uplink transmission.

In some examples of the method, apparatuses, and non-transitory computer-readable medium described herein, the signal includes at least one of the grant, an RRC signal, a MAC CE, a DCI, or a combination thereof.

A method for wireless communications at a UE is described. The method may include receiving a signal indicating a set of resources for an uplink data transmission, the signal further identifying a set of available first parameter values for the uplink data transmission, receiving a grant activating the set of resources for the uplink data transmission, the grant indicating a second parameter value for the uplink data transmission, determining a first parameter value for the uplink data transmission from the set of available first parameter values based on the second parameter value indicated in the grant, and performing the uplink data transmission using the set of resources and according to the first parameter value and the second parameter value, where the first parameter value includes either a TBS parameter or a slot aggregation factor and the second parameter value include either the slot aggregation factor or the TBS parameter.

An apparatus for wireless communications at a UE is described. The apparatus may include a processor, memory in electronic communication with the processor, and instructions stored in the memory. The instructions may be executable by the processor to cause the apparatus to receive a signal indicating a set of resources for an uplink data transmission, the signal further identifying a set of available first parameter values for the uplink data transmission, receive a grant activating the set of resources for the uplink data transmission, the grant indicating a second parameter value for the uplink data transmission, determine a first parameter value for the uplink data transmission from the set of available first parameter values based on the second parameter value indicated in the grant, and perform the uplink data transmission using the set of resources and according to the first parameter value and the second parameter value, where the first parameter value includes either a TBS parameter or a slot aggregation factor and the second parameter value include either the slot aggregation factor or the TBS parameter.

Another apparatus for wireless communications at a UE is described. The apparatus may include means for receiving a signal indicating a set of resources for an uplink data transmission, the signal further identifying a set of available first parameter values for the uplink data transmission, means for receiving a grant activating the set of resources for the uplink data transmission, the grant indicating a second parameter value for the uplink data transmission, means for determining a first parameter value for the uplink data transmission from the set of available first parameter values based on the second parameter value indicated in the grant, and means for performing the uplink data transmission using the set of resources and according to the first parameter value and the second parameter value, where the first parameter value includes either a TB S parameter or a slot aggregation factor and the second parameter value include either the slot aggregation factor or the TBS parameter.

A non-transitory computer-readable medium storing code for wireless communications at a UE is described. The code may include instructions executable by a processor to receive a signal indicating a set of resources for an uplink data transmission, the signal further identifying a set of available first parameter values for the uplink data transmission, receive a grant activating the set of resources for the uplink data transmission, the grant indicating a second parameter value for the uplink data transmission, determine a first parameter value for the uplink data transmission from the set of available first parameter values based on the second parameter value indicated in the grant, and perform the uplink data transmission using the set of resources and according to the first parameter value and the second parameter value, where the first parameter value includes either a TBS parameter or a slot aggregation factor and the second parameter value include either the slot aggregation factor or the TBS parameter.

In some examples of the method, apparatuses, and non-transitory computer-readable medium described herein, and the method, apparatuses, and non-transitory computer-readable medium may include further operations, features, means, or instructions for identifying, based on the signal, a scaler associated with the TBS parameter and identifying the slot aggregation factor for the uplink data transmission based on the scaler and the TB S parameter indicated in the grant.

In some examples of the method, apparatuses, and non-transitory computer-readable medium described herein, and the method, apparatuses, and non-transitory computer-readable medium may include further operations, features, means, or instructions for identifying the slot aggregation factor for the uplink data transmission based on the TBS parameter indicated in the grant and the set of available first parameter values indicated in the signal.

In some examples of the method, apparatuses, and non-transitory computer-readable medium described herein, and the method, apparatuses, and non-transitory computer-readable medium may include further operations, features, means, or instructions for identifying, based on the signal, a scaler associated with the slot aggregation factor and identifying the TBS parameter for the uplink data transmission based on the scaler and the slot aggregation factor indicated in the grant.

In some examples of the method, apparatuses, and non-transitory computer-readable medium described herein, and the method, apparatuses, and non-transitory computer-readable medium may include further operations, features, means, or instructions for identifying the TBS parameter for the uplink data transmission based on the slot aggregation factor indicated in the grant and the set of available first parameter values indicated in the signal.

A method for wireless communications at a base station is described. The method may include transmitting a signal indicating a set of resources for an uplink data transmission, the signal further identifying a set of available first parameter values for the uplink data transmission, determining a first parameter value for the uplink data transmission from the set of available first parameter values based on a second parameter value indicated in a grant, transmitting the grant activating the set of resources for the uplink data transmission, the grant indicating the second parameter value for the uplink data transmission, and performing the uplink data transmission using the set of resources and according to the first parameter value and the second parameter value, where the first parameter value includes either a TB S parameter or a slot aggregation factor and the second parameter value include either the slot aggregation factor or the TBS parameter.

An apparatus for wireless communications at a base station is described. The apparatus may include a processor, memory in electronic communication with the processor, and instructions stored in the memory. The instructions may be executable by the processor to cause the apparatus to transmit a signal indicating a set of resources for an uplink data transmission, the signal further identifying a set of available first parameter values for the uplink data transmission, determine a first parameter value for the uplink data transmission from the set of available first parameter values based on a second parameter value indicated in a grant, transmit the grant activating the set of resources for the uplink data transmission, the grant indicating the second parameter value for the uplink data transmission, and perform the uplink data transmission using the set of resources and according to the first parameter value and the second parameter value, where the first parameter value includes either a TBS parameter or a slot aggregation factor and the second parameter value include either the slot aggregation factor or the TBS parameter.

Another apparatus for wireless communications at a base station is described. The apparatus may include means for transmitting a signal indicating a set of resources for an uplink data transmission, the signal further identifying a set of available first parameter values for the uplink data transmission, means for determining a first parameter value for the uplink data transmission from the set of available first parameter values based on a second parameter value indicated in a grant, means for transmitting the grant activating the set of resources for the uplink data transmission, the grant indicating the second parameter value for the uplink data transmission, and means for performing the uplink data transmission using the set of resources and according to the first parameter value and the second parameter value, where the first parameter value includes either a TBS parameter or a slot aggregation factor and the second parameter value include either the slot aggregation factor or the TBS parameter.

A non-transitory computer-readable medium storing code for wireless communications at a base station is described. The code may include instructions executable by a processor to transmit a signal indicating a set of resources for an uplink data transmission, the signal further identifying a set of available first parameter values for the uplink data transmission, determine a first parameter value for the uplink data transmission from the set of available first parameter values based on a second parameter value indicated in a grant, transmit the grant activating the set of resources for the uplink data transmission, the grant indicating the second parameter value for the uplink data transmission, and perform the uplink data transmission using the set of resources and according to the first parameter value and the second parameter value, where the first parameter value includes either a TBS parameter or a slot aggregation factor and the second parameter value include either the slot aggregation factor or the TBS parameter.

In some examples of the method, apparatuses, and non-transitory computer-readable medium described herein, and the method, apparatuses, and non-transitory computer-readable medium may include further operations, features, means, or instructions for identifying, based on the signal, a scaler associated with the TBS parameter and identifying the slot aggregation factor for the uplink data transmission based on the scaler and the TB S parameter indicated in the grant.

In some examples of the method, apparatuses, and non-transitory computer-readable medium described herein, and the method, apparatuses, and non-transitory computer-readable medium may include further operations, features, means, or instructions for identifying the slot aggregation factor for the uplink data transmission based on the TBS parameter indicated in the grant and the set of available first parameter values indicated in the signal.

In some examples of the method, apparatuses, and non-transitory computer-readable medium described herein, and the method, apparatuses, and non-transitory computer-readable medium may include further operations, features, means, or instructions for identifying, based on the signal, a scaler associated with the slot aggregation factor and identifying the TBS parameter for the uplink data transmission based on the scaler and the slot aggregation factor indicated in the grant.

In some examples of the method, apparatuses, and non-transitory computer-readable medium described herein, and the method, apparatuses, and non-transitory computer-readable medium may include further operations, features, means, or instructions for identifying the TBS parameter for the uplink data transmission based on the slot aggregation factor indicated in the grant and the set of available first parameter values indicated in the signal.

A method for wireless communications at a UE is described. The method may include transmitting an indication that uplink data is to be transmitted in an uplink data transmission, receiving, based on the indication, a grant triggering the uplink data transmission, where the grant triggers the uplink data transmission using a set of multiple transport blocks, and performing the uplink data transmission using a set of resources and based on the grant, the set of resources spanning the set of multiple transport blocks.

An apparatus for wireless communications at a UE is described. The apparatus may include a processor, memory in electronic communication with the processor, and instructions stored in the memory. The instructions may be executable by the processor to cause the apparatus to transmit an indication that uplink data is to be transmitted in an uplink data transmission, receive, based on the indication, a grant triggering the uplink data transmission, where the grant triggers the uplink data transmission using a set of multiple transport blocks, and perform the uplink data transmission using a set of resources and based on the grant, the set of resources spanning the set of multiple transport blocks.

Another apparatus for wireless communications at a UE is described. The apparatus may include means for transmitting an indication that uplink data is to be transmitted in an uplink data transmission, means for receiving, based on the indication, a grant triggering the uplink data transmission, where the grant triggers the uplink data transmission using a set of multiple transport blocks, and means for performing the uplink data transmission using a set of resources and based on the grant, the set of resources spanning the set of multiple transport blocks.

A non-transitory computer-readable medium storing code for wireless communications at a UE is described. The code may include instructions executable by a processor to transmit an indication that uplink data is to be transmitted in an uplink data transmission, receive, based on the indication, a grant triggering the uplink data transmission, where the grant triggers the uplink data transmission using a set of multiple transport blocks, and perform the uplink data transmission using a set of resources and based on the grant, the set of resources spanning the set of multiple transport blocks.

Some examples of the method, apparatuses, and non-transitory computer-readable medium described herein may further include operations, features, means, or instructions for receiving a signal indicating the set of resources spanning the set of multiple transport blocks.

Some examples of the method, apparatuses, and non-transitory computer-readable medium described herein may further include operations, features, means, or instructions for identifying the set of resources spanning the set of multiple transport blocks based on the grant.

Some examples of the method, apparatuses, and non-transitory computer-readable medium described herein may further include operations, features, means, or instructions for identifying, based on the grant, at least one of a repetition pattern, a frequency hopping pattern, a demodulation reference signal bundling, or any combination thereof, where the uplink data transmission may be performed according to the repetition pattern, the frequency hopping pattern, the demodulation reference signal bundling, or a combination thereof.

A method for wireless communications at a base station is described. The method may include receiving, from a UE, an indication that uplink data is to be transmitted in an uplink data transmission, transmitting, based on the indication, a grant triggering the uplink data transmission, where the grant triggers the uplink data transmission using a set of multiple transport blocks, and performing the uplink data transmission using a set of resources and based on the grant, the set of resources spanning the set of multiple transport blocks.

An apparatus for wireless communications at a base station is described. The apparatus may include a processor, memory in electronic communication with the processor, and instructions stored in the memory. The instructions may be executable by the processor to cause the apparatus to receive, from a UE, an indication that uplink data is to be transmitted in an uplink data transmission, transmit, based on the indication, a grant triggering the uplink data transmission, where the grant triggers the uplink data transmission using a set of multiple transport blocks, and perform the uplink data transmission using a set of resources and based on the grant, the set of resources spanning the set of multiple transport blocks.

Another apparatus for wireless communications at a base station is described. The apparatus may include means for receiving, from a UE, an indication that uplink data is to be transmitted in an uplink data transmission, means for transmitting, based on the indication, a grant triggering the uplink data transmission, where the grant triggers the uplink data transmission using a set of multiple transport blocks, and means for performing the uplink data transmission using a set of resources and based on the grant, the set of resources spanning the set of multiple transport blocks.

A non-transitory computer-readable medium storing code for wireless communications at a base station is described. The code may include instructions executable by a processor to receive, from a UE, an indication that uplink data is to be transmitted in an uplink data transmission, transmit, based on the indication, a grant triggering the uplink data transmission, where the grant triggers the uplink data transmission using a set of multiple transport blocks, and perform the uplink data transmission using a set of resources and based on the grant, the set of resources spanning the set of multiple transport blocks.

Some examples of the method, apparatuses, and non-transitory computer-readable medium described herein may further include operations, features, means, or instructions for transmitting a signal indicating the set of resources spanning the set of multiple transport blocks.

Some examples of the method, apparatuses, and non-transitory computer-readable medium described herein may further include operations, features, means, or instructions for identifying the set of resources spanning the set of multiple transport blocks based on the grant.

Some examples of the method, apparatuses, and non-transitory computer-readable medium described herein may further include operations, features, means, or instructions for identifying, based on the grant, at least one of a repetition pattern, a frequency hopping pattern, a demodulation reference signal bundling, or any combination thereof, where the uplink data transmission may be performed according to the repetition pattern, the frequency hopping pattern, the demodulation reference signal bundling, or a combination thereof.

BRIEF DESCRIPTION OF THE DRAWINGS

FIG. 4 illustrates an example of a coverage enhancement configuration that supports latency reduction and coverage enhancement for extended reality in accordance with aspects of the present disclosure.

DETAILED DESCRIPTION

Figure 1:
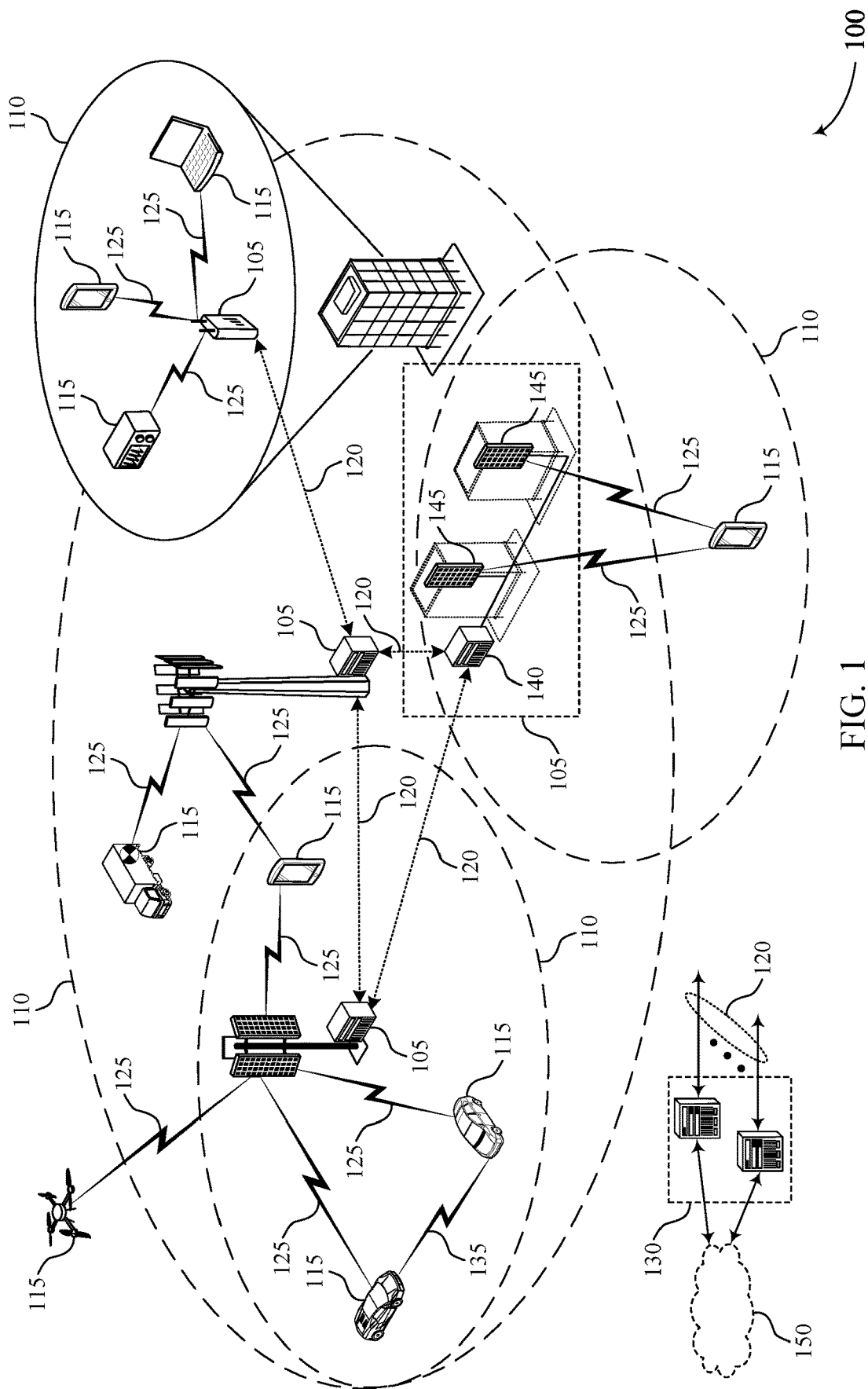
FIG. 1 illustrates an example of a wireless communication system that supports latency reduction and coverage enhancement for extended reality in accordance with aspects of the present disclosure.

Some wireless communication systems may support extended reality (XR) communications. These communications will introduce heavy uplink traffic for extended periods of time (e.g., during virtual reality (VR) games/movies, VR meetings, etc.). Extended uplink traffic typically increases motion-to-render-to-photon (M2R2P) latency and degrades the user experience. To address this, some wireless communication systems use semi-persistent resources (e.g., configured grant (CG) and/or proactive grant (PG) resources) for the uplink traffic. For example, a type-2 CG and/or PG downlink control information (DCI) grant may then be used to active the semi-persistent resources and, to some extent, provide some degree of channel adaptation (e.g., channel performance determination based on the activating DCI). However, such approaches are insufficient to fully address the increased uplink traffic that is associated with XR traffic (or any other type of extended uplink traffic).

Aspects of the disclosure are initially described in the context of wireless communication systems. Generally, the described techniques provide for various techniques to decrease latency of extended uplink traffic and provide coverage enhancements, such as in an XR scenario.

In some aspects, this may include a joint transmission of a scheduling request (SR)/buffer status report (BSR) (which may be collectively referred to as SR for simplicity) and a sounding reference signal (SRS). The SRS may be used to add channel performance determination at the transmitting device, which will improve resource allocation, configuration, for the subsequent uplink transmission(s). The joint transmission may be separate from a corresponding uplink data transmission (such as a physical uplink shared channel (PUSCH) transmission). For example, the SR/BSR and SRS may be transmitted back-to-back with the PUSCH transmission. In another example, the SR/BSR may be multiplexed into the PUSCH transmission with the SRS transmitted afterwards. In yet another example, the SRS transmission may use specific root or cyclic shifts to implicitly indicate the SR/BSR. Accordingly, a user equipment (UE) may perform the joint uplink transmission (e.g., the SRS/SR transmission) and the PUSCH transmission.

In some aspects, transport block size (TB S) scaling and optimizations may be implemented using a joint slot aggregation factor/TBS scaling indication. The TBS scaling parameter may be indicated implicitly (e.g., may be a function of the explicitly indicated slot aggregation factor) or explicitly (e.g., may map the slot aggregation factor to subfield of the DCI). The slot aggregation factor may be indicated implicitly (e.g., may be a function of the explicitly indicated TBS scaling factor) or explicitly (e.g., may map a TBS scaling factor to a specific subfield of the DCI). Accordingly, the UE may perform a PUSCH transmission using TBS scaling (e.g., based on a TBS scaler) to the base station.

In some aspects, multiple-transport block scheduling for semi-persistent resources (e.g., CG and/or PG resources) may be implemented. In one example, radio resource control (RRC) signaling may be used for resource allocation/modulation coding scheme (MCS) indication during the CG/PG configuration. In this example, the DCI grant may then trigger the multi-TB transmission using the CG/PG resources. In another example, the DCI activating the CG/PG resources may configure the multi-TB transmission. Accordingly, the UE may perform the PUSCH transmission using multiple transport blocks to the base station.

Aspects of the disclosure are further illustrated by and described with reference to apparatus diagrams, system diagrams, and flowcharts that relate to latency reduction and coverage enhancement for extended reality.

FIG. 1 illustrates an example of a wireless communication system 100 that supports latency reduction and coverage enhancement for extended reality in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may identify a resource for a joint uplink transmission comprising a SRS and a SR. The UE 115 may receive a grant of a set of resources for an uplink data transmission to a base station 105. The UE 115 may perform the joint uplink transmission comprising the SRS and the SR using the resource for the joint uplink transmission in connection with performing the uplink data transmission using the set of resources for the uplink data transmission.

A base station 105 may identify a resource for a joint uplink transmission comprising a SRS and a SR. The base station 105 may transmit a grant of a set of resources for an uplink data transmission from a UE 115. The base station 105 may perform the joint uplink transmission comprising the SRS and the SR using the resource for the joint uplink transmission in connection with performing the uplink data transmission using the set of resources for the uplink data transmission.

A UE 115 may receive a signal indicating a set of resources for an uplink data transmission, the signal further identifying a set of available first parameter values for the uplink data transmission. The UE 115 may receive a grant activating the set of resources for the uplink data transmission, the grant indicating a second parameter value for the uplink data transmission. The UE 115 may determine a first parameter value for the uplink data transmission from the set of available first parameter values based at least in part on the second parameter value indicated in the grant. The UE 115 may perform the uplink data transmission using the set of resources and according to the first parameter value and the second parameter value, wherein the first parameter value comprises either a TBS parameter or a slot aggregation factor and the second parameter value comprise either the slot aggregation factor or the TBS parameter.

A base station 105 may transmit a signal indicating a set of resources for an uplink data transmission, the signal further identifying a set of available first parameter values for the uplink data transmission. The base station 105 may determine a first parameter value for the uplink data transmission from the set of available first parameter values based at least in part on a second parameter value indicated in a grant. The base station 105 may transmit the grant activating the set of resources for the uplink data transmission, the grant indicating the second parameter value for the uplink data transmission. The base station 105 may perform the uplink data transmission using the set of resources and according to the first parameter value and the second parameter value, wherein the first parameter value comprises either a TBS parameter or a slot aggregation factor and the second parameter value comprise either the slot aggregation factor or the TBS parameter.

A UE 115 may transmit an indication that uplink data is to be transmitted in an uplink data transmission. The UE 115 may receive, based at least in part on the indication, a grant triggering the uplink data transmission, wherein the grant triggers the uplink data transmission using a plurality of transport blocks. The UE 115 may perform the uplink data transmission using a set of resources and based at least in part on the grant, the set of resources spanning the plurality of transport blocks.

A base station 105 may receive, from a UE 115, an indication that uplink data is to be transmitted in an uplink data transmission. The base station 105 may transmit, based at least in part on the indication, a grant triggering the uplink data transmission, wherein the grant triggers the uplink data transmission using a plurality of transport blocks. The base station 105 may perform the uplink data transmission using a set of resources and based at least in part on the grant, the set of resources spanning the plurality of transport blocks.

Figure 2:
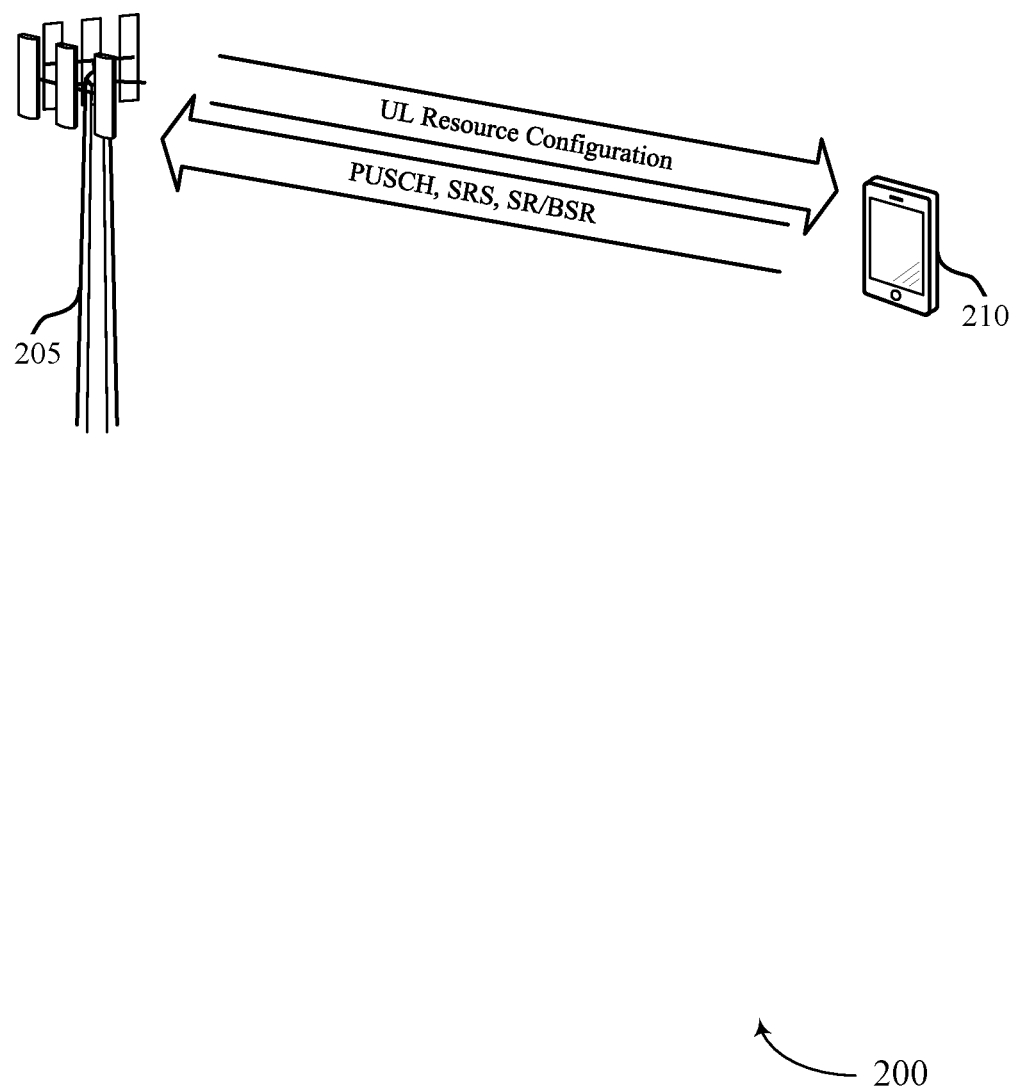
FIG. 2 illustrates an example of a wireless communication system that supports latency reduction and coverage enhancement for extended reality in accordance with aspects of the present disclosure.

FIG. 2 illustrates an example of a wireless communication system 200 that supports latency reduction and coverage enhancement for extended reality in accordance with aspects of the present disclosure. Wireless communication system 200 may include base station 205 and/or UE 210, which may be examples of the corresponding devices described herein.

Wireless communication system 200 may support extended uplink transmissions from UE 210 to base station 205. Traditionally, cellular networks typically see heavier downlink traffic than uplink traffic. For example, UE 210 may communicate with base station 205 by sending a request for downlink data (e.g., a request to retrieve a webpage, a request to initiate a downlink streaming application, and the like). Accordingly, UE 210 may transmit uplink data (e.g., the request) with a relatively small payload and base station 205 may respond by streaming the downlink data to UE 210 (which may include a substantially larger data payload). Uplink traffic may be comparable to downlink traffic during a call (e.g., an audio call and/or a video call) or similar use case. However, extended uplink data transmissions may become more prevalent in some use cases, such as extended reality use cases.

Extended reality use cases may cover various scenarios. For example, one such scenario may include the user wearing a device (e.g., such as a virtual reality (VR) head mounted device, or any other wearable device) that includes the cellular modem (e.g., UE 210 may be a component of the wearable device in this example). This scenario may be associated with a stringent quality of service (QoS) requirement that may support indoor and/or outdoor scenarios. In one example, this scenario may cover head and/or other body movements (e.g., VR split rendering), may be deployed in an enterprise setting and/or a residential setting, and the like. In some aspects, this scenario may also support a high rate of mobility (e.g., such as in a vehicle-based alternate reality (AR)/VR scenario). Another scenario for extended reality may include an AR split computation scenario where the wearable device is connected wirelessly and/or using a wired connection (e.g., via Wi-Fi, Bluetooth, USB cable, etc.) to a puck or other device having the cellular modem (e.g., such as UE 210 having the cellular modem and being operatively connected to the wearable device). This scenario may also have stringent QoS requirements and support enterprise and/or residential applications, indoor and/or outdoor use, and/or high-speed and/or low-speed (e.g., pedestrian) applications. Another scenario for extended reality may include using a 5G smart phone, tablet, laptop, etc. (e.g., UE 210). This scenario may also have stringent QOS requirements, utilize over-the-top (OTT) techniques and support enterprise and/or residential applications, indoor and/or outdoor use, and/or high-speed, low-speed (e.g., pedestrian), and/or static (e.g., fixed or indoor) applications. Accordingly, each use case for extended reality may result in extended uplink traffic from UE 210 to base station 210, where the speed (e.g., latency) and/or QoS of the uplink traffic is an important aspect for usability and user satisfaction.

Due to the heavy uplink traffic patterns, in addition to various coverage enhancements, uplink transmissions in an extended reality scenario typically takes longer than is desired (e.g., may not meet the QoS and/or latency requirements). Accordingly, extended reality and/or other similar use cases may extend uplink transmissions such that motion-to-render-to-photon (M2R2P) time increases and user experience degrades.

To address this, some wireless communication systems may utilize semi-persistent resources to reduce the latency of uplink traffic. For example, CG and/or PG resources may be configured for UE 210. In a type-2 CG configuration of semi-persistent resources, the DCI scrambled by a configured scheduling radio network temporary identifier (CS-RNTI) may be used to activate/deactivate the uplink transmission and, in some examples, modify the resource allocation, MCS, etc. For a PG configuration of semi-persistent resources, the DCI scrambled using a cell radio network temporary identifier (C-RNTI) may be periodically transmitted to provide a dynamic uplink grant of the configured resources. However, such techniques may not fully address the latency and/or QoS requirements for some extended uplink traffic types.

Accordingly, aspects of the described techniques provide an improved trade-off in terms of latency, link adaptation, power savings, and the like. Broadly, the described techniques support a mixed traffic pattern in the extended reality use case scenarios, for example. Such techniques may include, but are not limited to, a joint uplink transmission of an SRS and a SR/BSR to reduce latency and/or signaling overhead, TBS scaling and MCS optimizations for coverage enhancements and latency reduction, multi-transport block scheduling for a reduction of signaling overhead and latency, and the like. Such techniques may be utilized alone or in any combination.

In some aspects, this may include base station 205 and/or UE 210 identifying a resource for a joint uplink transmission that includes an SRS and a SR. As discussed above, the SR may include an SR request from UE 210 requesting uplink resources and/or a BSR from UE 210 identifying or otherwise indicating that UE 210 has uplink data to transmit. Accordingly, SR may refer to any combination of SR/BSR from UE 210. In some examples, the resource for the joint uplink transmission may be known beforehand (e.g., preconfigured or otherwise known by base station 205 and/or UE 210). For example, joint uplink transmission resources may be adopted in the relevant standards are otherwise identified/set aside within wireless communication system 200. Additionally or alternatively, the base station 205 may transmit, convey, or otherwise identify the resource(s) for the joint uplink transmission to UE 210. For example, base station 205 may transmit a signal to UE 210 indicating (explicitly and/or implicitly) the resource(s) for the joint uplink transmission. The signal may include dedicated RRC signaling (e.g., using one or more bits, fields, parameters, and the like) configuring, identifying, or otherwise indicating the resource(s). The signal may include a DCI (e.g., a PG and/or type-2 CG DCI grant) carrying or otherwise conveying information identifying the resource(s) for the joint uplink transmission. The signal may include MAC CE signaling that carries or otherwise conveys information identifying the resource(s) for the joint uplink transmission. In some examples, base station 205 may use any combination of preconfigured resources, dedicated RRC signaling, DCI signaling, and/or MAC CE signaling to identify or otherwise indicate the resource(s) for the joint uplink transmission to UE 210. The resource(s) for the joint uplink transmission may include time resources, frequency resources, spatial resources, code resources, and the like, alone or in any combination.

In some aspects, the joint uplink transmission may be performed in conjunction with an uplink data transmission (e.g., a PUSCH transmission). For example, base station 205 may transmit or otherwise convey a grant (e.g., a DCI) for a set of resources for the uplink data transmission from UE 210 to base station 205. In the example where the uplink data transmission utilizes CG and/or PG resources, this may include base station 205 identifying the RRC configured CG and/or PG resources in the DCI triggering the semi-persistent resources. The set of resources for the uplink data transmission (e.g., the PUSCH transmission) may include time resources, frequency resources, spatial resources, code resources, and the like, alone or in any combination. In some aspects, the uplink data transmission may utilize CG and/or PG configured resources (e.g., semi-persistent resources), although it is to be understood that the uplink data transmission is not limited to semi-persistent resources. Instead, the resources for the uplink data transmission may be dynamically configured by base station 205 for UE 210.

In some examples, the set of resources for the uplink data transmission may be periodic resources in that UE 210 is to perform a series of uplink data transmissions according to the periodic schedule. The joint uplink transmission (e.g., SRS and SR/BSR) may also be scheduled using a periodic resource, which may be the same or different as the periodic schedule for the uplink data transmission. The joint uplink transmission (e.g., SRS and SR/BSR) may also be scheduled using non-periodic resources.

Accordingly, base station 205 and UE 210 may perform the joint uplink transmission (e.g., including the SRS and SR/BSR) using the resource(s) identified for the joint uplink transmission in connection with performing the uplink data transmission using the set of resources configured or otherwise identified for the uplink data transmission. Broadly, the joint uplink transmission and corresponding uplink data transmission may be performed according to various configurations. For example, the uplink data transmission and the joint uplink transmission may be performed back-to-back using a TDM technique across one or more subcarriers. Accordingly, SR/BSR may be mapped to an uplink control channel (e.g., PUCCH), which may be transmitted back-to-back with SRS and time division multiplexed with PUSCH.

In another example, the SR/BSR may be multiplexed with the uplink data transmission to obtain or otherwise generate a multiplexed uplink transmission. In this example, the multiplexed uplink transmission and the SRS may be transmitted back-to-back according to the TDM technique and using one or more subcarriers. Accordingly, in this example SR/BSR may be mapped to uplink control information (UCI), which is multiplexed with PUSCH and transmitted back-to-back with SRS.

In another example, a particular root sequence, cyclic shift, and the like, alone or in combination, may be utilized for the SRS in order to implicitly identify or otherwise indicate the SR/BSR. For example, the root sequence and/or cyclic shift may be applied to the SRS. The root sequence and/or cyclic shift selected for application to the SRS may be associated with a particular SR/BSR. Accordingly, transmitting the uplink data transmission and the SRS back-to-back according to a TDM technique and using one or more subcarriers may indicate the SR/BSR. Accordingly, the SR/BSR may be mapped to cyclic shift and/or the root of the SRS sequences, which are then time division multiplexed with PUSCH.

In some aspects, coverage enhancements may also be applied to one or more of the described techniques. For example, the uplink data transmission and/or the joint uplink transmission may be performed utilizing a repetition pattern, frequency hopping pattern, DMRS bundling, and the like, alone or in any combination. Accordingly, performing the uplink data transmission in connection with the joint uplink transmission including the SR/BSR and SRS may be performed according to any such coverage enhancement(s).

Aspects of the described techniques also include TBS scaling and MCS optimizations. Joint TBS scaling and MCS optimization may be applied to CG/PG (e.g., semi-persistent resources) uplink data transmissions and may be based on a given traffic pattern, the capability of UE 210 (e.g., based on UE capability signaling from UE 210 to base station 205), latency/QoS requirements for the uplink data transmission, and the like. In some aspects, an optimized TBS table may be determined or otherwise identified by the network and signaled to UE 210. Based on the level of coverage enhancement, UE capabilities, and the like, a list of TBS scaling factors (e.g., scalers) may be determined or otherwise identified by the network and included in the DCI for the type-2 CG and/or PG resources. In some examples, this may include mapping the TBS scaling factor (e.g., scaler) to a sub-field in the DCI activating the PG or type-2 CG. In one non-limiting example, this may include using two bits to indicate the scaler (e.g., "00" sets the TBS scaler to 1, "01" sets the TBS scaler to ½, "10" sets the TBS scaler to ¼, and "11" sets the TBS scaler to ⅛). Other scaler values and/or indication configurations may also be utilized.

In some aspects, this may include a simplified indication of the slot aggregation factor and TBS scaling factor. For example, base station 205 may identify or otherwise indicate the TBS scaling factor or slot aggregation factor in the DCI. For example, base station 205 may transmit, provide, or otherwise convey a grant (e.g., DCI grant) activating a set of resources (e.g., CG/PG resources) for an uplink data transmission (e.g., a PUSCH transmission). The grant and/or a separate configuration signal may generally identify or otherwise activate the semi-persistent resources and may also convey a set of available first parameter values for the uplink data transmission. The grant may identify or otherwise indicate a second parameter value for the uplink data transmission. In this example, the second parameter value may be the TBS parameter (e.g., the TBS value and/or scaler) or the slot aggregation factor. UE 210 may determine a first parameter value for the uplink data transmission based on the second parameter value indicated in the grant. That is, when the second parameter value indicated in the DCI is the TBS parameter, UE 210 may determine the slot aggregation factor for the uplink data transmission. When the second parameter value indicated in the DCI is the slot aggregation factor, UE 210 may determine the TBS parameter for the uplink data transmission. Accordingly, base station 205 and UE 210 may perform the uplink data transmission using the set of resources (e.g., CG and/or PG resources) and according to the first parameter value and the second parameter value.

More particular, when the TBS parameter (e.g., TBS scaling factor or more simply scaler) is indicated in the DCI, the slot aggregation factor can be optionally signaled in the CG/PG implicitly or explicitly.

In an implicit TBS parameter indication scenario, the slot aggregation factor may correspond to the TBS scaling factor multiplied by C, where C is greater than zero and is a constant integer. For example, in this scenario the second parameter value indicated in the grant may be the TBS parameter and the first parameter value may correspond to the slot aggregation factor. Accordingly, base station 205 and/or UE 210 may identify or otherwise determine a scaler associated with the TBS parameter and identify the slot aggregation factor for the uplink data transmission based on the scaler and the TBS parameter indicated in the grant.

In an explicit TBS parameter indication scenario, the slot aggregation factor (e.g., 1, 2, 4, 8) may be mapped to a specific sub-field of the CG/PG (e.g., of the DCI activating the CG/PG resources). For example, base station 205 and/or UE 210 may identify or otherwise determine the slot aggregation factor for the uplink data transmission based on the TBS parameter indicated in the grant and the set of available first parameter values indicated in the signal configuring the CG/PG resources. That is, a set of available slot aggregation factors may be included in the signal configuring the CG for/PG resources. The TBS parameter indicated in the grant may be mapped to a particular slot aggregation factor according to the signal configuring the CG/PG resources.

Similarly, when the slot aggregation factor is indicated in the DCI, the TBS parameter (e.g., the TBS scaling factor) can be optionally signaled in the CG/PG.

In an implicit slot aggregation indication scenario, the TBS scaling factor may be equal to the slot aggregation factor divided by C, where C is greater than zero and is a constant integer. Accordingly, base station 205 and/or UE 210 may identify or otherwise determine a scaler associated with a slot aggregation factor (e.g., C in this example) and identify the TBS parameter for the uplink data transmission based on the scaler and the slot aggregation factor indicated in the grant.

In an explicit slot aggregation indication scenario, the TBS scaling factor may be mapped to a particular sub-field of the CG/PG. For example, base station 205 and/or UE 210 may identify the TBS parameter for the uplink data transmission based on the slot aggregation factor indicated in the grant and the set of available first parameter values indicated in the signal configuring the CG/PG semi-persistent resources.

Accordingly, UE 210 may perform the uplink data transmission to base station 205 using the set of resources (e.g., the semi-persistent CG/PG resources) and according to the first and second parameter values.

In some aspects of the described techniques, this may include multiple transport block scheduling by CG/PG. That is, UE 210 may transmit or otherwise convey an indication to base station 205 that uplink data is to be transmitted in an uplink data transmission. For example, UE 210 may transmit or otherwise convey an indication of a SR, a BSR and/or a SR/BSR and SRS in a joint uplink transmission example, as discussed herein.

In response, base station 205 may transmit, provide, or otherwise convey a grant triggering the uplink data transmission (e.g., a DCI grant). Broadly, the grant may identify or otherwise trigger the uplink data transmission that spans a plurality of transport blocks. In one option, this may include the resource allocation and the MCS for the multi-transport block uplink data transmission being configured by dedicated RRC signaling (e.g., using a look up table), with the actual uplink data transmission using multiple transport blocks being triggered by the DCI (e.g., PG or type-2 CG). Accordingly, in this option base station 205 may transmit or otherwise convey a signal to UE 210 indicating the set of resources spanning the plurality of transport blocks for the uplink data transmission.

In another option, the PG or type-2 CG DCI grant may be configured or otherwise enhanced to support multiple transport block scheduling and MCS adaptation. For example, in this option base station 205 may transmit or otherwise convey information identifying the set of resources spanning the plurality of transport blocks for the uplink data transmission in the grant. Accordingly, UE 210 may perform the uplink data transmission to base station 205 using the set of resources and based on the grant, with the set of resources spanning multiple or a plurality of transport blocks.

As discussed above, the techniques described herein, alone or in any combination, may utilize various coverage enhancement techniques for the corresponding uplink data transmission and/or joint uplink transmission. For example, repetition, frequency hopping, DMRS bundling, and the like, alone or in any combination, may be identified for the uplink data transmission (e.g., PUSCH alone and/or PUSCH with UCI multiplexed, PUCCH, and/or SRS).

Figure 3A:
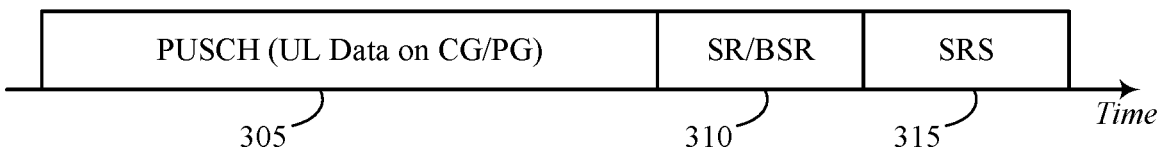
FIGS. 3A-3C illustrate an example of a joint uplink transmission configuration that supports latency reduction and coverage enhancement for extended reality in accordance with aspects of the present disclosure.
Figure 3B:
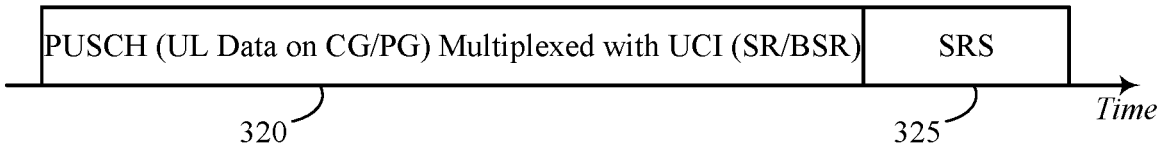
Figure 3C:
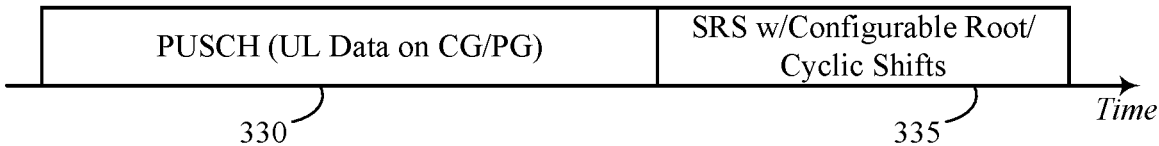

FIGS. 3A-3C illustrate examples of a joint uplink transmission configuration 300 that supports latency reduction and coverage enhancement for extended reality in accordance with aspects of the present disclosure. Aspects joint uplink transmission configuration 300 may be implemented by a base station and/or UE, which may be examples of the corresponding devices described herein. Broadly, joint uplink transmission configuration 300-a of FIG. 3A illustrates an example where the SR/BSR are mapped to PUCCH and transmitted back-to-back with SRS and TDM'd with PUSCH. Joint uplink transmission configuration 300-b of FIG. 3B illustrates an example where SR/BSR are mapped to UCI, which is multiplexed with PUSCH and transmitted back-to-back (e.g., TDM'd) with SRS. Finally, joint uplink transmission configuration 300-c of FIG. 3C illustrates an example where SR/BSR are mapped to a cyclic shift or root of SRS sequences, which are TDM'd with PUSCH.

As discussed above, aspects of the described techniques provide various mechanisms to reduce latency and improve QoS for extended uplink transmissions, such as an extended reality scenario (e.g., VR, AR, etc.). In at least some examples, these techniques may utilize a joint uplink transmission of SR/BSR (referred to simply as SR in some instances for simplicity) and SRS. For example, the UE and base station may identify or otherwise determine the resource(s) for the joint uplink transmission that includes the SRS and SR. The resource(s) may be known a priori and/or may be configured for the UE by the base station. For example, the base station may use a signal, such as RRC signaling, DCI, MAC CE, etc., to indicate or otherwise identify the signal to the UE. The base station may transmit a grant to the UE indicating or otherwise identifying a set of resources for an uplink data transmission (e.g., the PUSCH transmission using CG and/or PG semi-persistent resources). Accordingly, the base station and UE may perform the joint uplink transmission including the SRS and the SR in connection with performing the uplink data transmission using the appropriate resources.

Joint uplink transmission configuration 300 illustrates three non-limiting examples of how the joint uplink transmission (e.g., SR/BSR and SRS) may be transmitted in connection with the uplink data transmission (e.g., PUSCH).

Turning first to joint uplink transmission configuration 300-a of FIG. 3A, this may include the UE transmitting the uplink data transmission (e.g., PUSCH 305) and the joint uplink transmission including SR 310 and SRS 315 back-to-back according to a TDM technique. That is, the UE may transmit the uplink data transmission (e.g., PUSCH 305, which includes uplink data being transmitted on semi-persistent CG and/or PG resources). At the conclusion of the uplink data transmission, the UE may transmit SR 310 (e.g., SR/BSR) followed by transmitting SRS 315. In some aspects, SR 310 may be mapped to PUCCH (e.g., transmitted on an uplink control channel). In some aspects, PUSCH 305, SR 310, and SRS 315 may be transmitted on one or more subcarriers, which may be the same subcarriers or different subcarriers. In some aspects, PUSCH 305, SR 310, and/or SRS 315 may be transmitted according to various coverage enhancement configurations, such as using repetition, frequency hopping, DMRS bundling, and the like.

Turning next to joint uplink transmission configuration 300-b of FIG. 3B, this may include the UE multiplexing the uplink data transmission (e.g., PUSCH) with the SR/BSR to obtain a multiplexed uplink transmission 320. The UE may then transmit the multiplexed uplink transmission 320 and the SRS 325 back-to-back according to a TDM technique. Accordingly, in this example SR/BSR may be mapped to UCI, which is multiplexed with PUSCH and transmitted back-to-back with SRS 325. In some aspects, multiplexed uplink transmission 320 and SRS 325 may be transmitted on one or more subcarriers, which may be the same subcarriers or different subcarriers. In some aspects, multiplexed uplink transmission 320 and SRS 325 may be transmitted according to various coverage enhancement configurations, such as using repetition, frequency hopping, DMRS bundling, and the like.

Turning finally to joint uplink transmission configuration 300-c of FIG. 3C, this may include the UE applying a root sequence and/or cyclic shift for the SRS 335 to indicate the SR/BSR. That is, the SR/BSR may be mapped to a particular cyclic shift or root of SRS sequences, with the SRS 335 having the specific configurable root and/or cyclic shift implicitly indicating the SR/BSR. Accordingly, in this example SR/BSR may be implicitly indicated via the SRS 335 root/cyclic shift and transmitted back-to-back with PUSCH 330 (e.g., the uplink data transmission). In some aspects, PUSCH 330 and SRS 335 may be transmitted on one or more subcarriers, which may be the same subcarriers or different subcarriers. In some aspects, PUSCH 330 and SRS 335 may be transmitted according to various coverage enhancement configurations, such as using repetition, frequency hopping, DMRS bundling, and the like.

Accordingly, joint uplink transmission configuration 300 provides various configurations which may be utilized for the joint uplink transmission of SR/BSR and SRS of the UE. In some aspects, the joint uplink transmission may improve channel performance determination by the base station (e.g., based on the SRS) and improve scheduling/activation for resources for the uplink data transmission (e.g., PUSCH).

FIG. 4 illustrates an example of a coverage enhancement configuration 400 that supports latency reduction and coverage enhancement for extended reality in accordance with aspects of the present disclosure. Aspects coverage enhancement configuration 400 may be implemented by a base station and/or UE, which may be examples of the corresponding devices described herein.

As discussed above, aspects of the described techniques provide various mechanisms to reduce latency and improve QoS for extended uplink transmissions, such as an extended reality scenario (e.g., VR, AR, etc.). In at least some examples, these techniques may utilize a joint uplink transmission of SR/BSR (referred to simply as SR in some instances for simplicity) and SRS. For example, the UE and base station may identify or otherwise determine the resource(s) for the joint uplink transmission that includes the SRS and SR. The resource(s) may be known a priori and/or may be configured for the UE by the base station. For example, the base station may use a signal, such as RRC signaling, DCI, MAC CE, etc., to indicate or otherwise identify the signal to the UE.

The base station may transmit a grant to the UE indicating or otherwise identifying a set of resources for an uplink data transmission (e.g., the PUSCH transmission using CG and/or PG semi-persistent resources). Accordingly, the base station and UE may perform the joint uplink transmission including the SRS and the SR in connection with performing the uplink data transmission using the appropriate resources. Additional techniques described herein may include TB S scaling port/MCS optimizations, multiple transport block uplink transmissions, and the like.

Carious coverage enhancement techniques may also be utilized for the joint uplink transmission, TBS scaling/MCS optimizations, multi-transport block scheduling, and the like, alone or in any combination. As discussed above, such optimized uplink transmissions may also be configured with repetition, frequency hopping DMRS bundling, and the like. Coverage enhancement configuration 400 illustrates a non-limiting example of coverage enhancements in the joint uplink transmission scenario (e.g., the joint transmission of PUSCH 405, PUCCH 410 which may include SR/BSR, and SRS 415).

For example, a coverage enhancement for PUSCH 405 may include repetition, frequency hopping, DMRS bundling, and the like, such that a first instance of PUSCH 405-*a* may correspond to a first repetition, a first frequency hop, a first DMRS bundle, and the like. Each instance of PUSCH 405 after that may correspond to a separate repetition, frequency hop, DMRS bundle, and the like, for the PUSCH 405. This may continue for m instances (e.g., until PUSCH 405-*m*), where m corresponds to a positive number.

A coverage enhancement for PUCCH 410 may include repetition, frequency hopping, DMRS bundling, and the like, such that a first instance of PUCCH 410-*a* may correspond to a first repetition, a first frequency hop, a first DMRS bundle, and the like, of PUCCH 410. Each instance of PUCCH 410 after that may correspond to a separate repetition, frequency hop, DMRS bundle, and the like. This may continue for n instances (e.g., until PUCCH 410-*n*), where n corresponds to a positive number. In some examples, PUCCH 410 may carry or otherwise convey SR/BSR of the joint uplink transmission (e.g., when mapped to UCI and multiplexed with PUSCH).

A coverage enhancement for SRS 415 may include repetition, frequency hopping, DMRS bundling, and the like, such that a first instance of SRS 415-*a* may correspond to a first repetition, a first frequency hop, a first DMRS bundle, and the like, of SRS 415. Each instance of SRS 415 after that may correspond to a separate repetition, frequency hop, DMRS bundle, and the like. This may continue for o instances (e.g., until PUCCH 415-*o*), where o corresponds to a positive number.

In some examples, PUSCH 405 may carry or otherwise convey SR/BSR (e.g., when signaled via PUCCH). In some examples, PUCCH 410 may carry or otherwise convey SR/BSR (e.g., when mapped to PUCCH). In some examples, SRS 415 may carry or otherwise convey SR/BSR (e.g., based on a cyclic shift/root sequence of SRS 415).

Accordingly, the base station and UE may perform the uplink data transmission (e.g., PUSCH 405) in connection with the joint uplink transmission including SR (e.g., PUCCH 410) and SRS 415 according to the appropriate resources and coverage enhancement.

Figure 5:
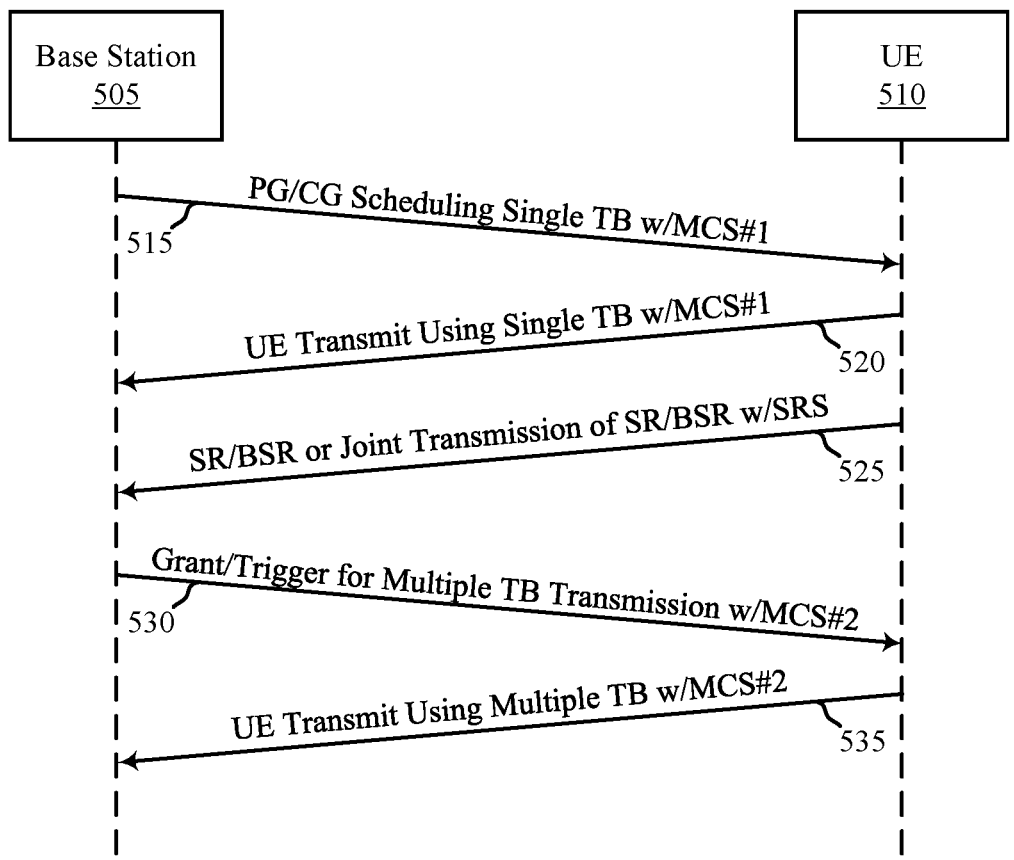
FIG. 5 illustrates an example of a process that supports latency reduction and coverage enhancement for extended reality in accordance with aspects of the present disclosure.

FIG. 5 illustrates an example of a process 500 that supports latency reduction and coverage enhancement for extended reality in accordance with aspects of the present disclosure. Aspects of process 500 may be implemented by a base station 505 and UE 510, which may be examples of corresponding devices described herein.

As discussed above, aspects of the described techniques provide various mechanisms to reduce latency and improve QoS for extended uplink transmissions, such as an extended reality scenario (e.g., VR, AR, etc.). In at least some examples, these techniques may utilize multi-transport block scheduling by CG/PG.

For example and at 515, base station 505 may transmit or otherwise convey (and UE 510 may receive or otherwise obtain) a signal scheduling a single transport block uplink data transmission using semi-persistent resources (e.g., PG/CG resources) and using a first MCS.

At 520, UE 510 may transmit or otherwise convey (and base station 505 may receive or otherwise obtain) an uplink data transmission (e.g., PUSCH) using the first MCS and on the semi-persistent resources. At 525, UE 510 may transmit or otherwise convey (and base station 505 may receive or otherwise obtain) an indication that uplink data is to be transmitted in an uplink data transmission (e.g., a subsequent uplink data transmission). The uplink data transmission at 520 and the indication of uplink data at 525 may be transmitted separately and/or may use the joint uplink transmission techniques discussed herein.

In response to the indication of uplink data to be transmitted, at 530 base station 505 may transmit or otherwise convey (and UE 510 may receive or otherwise obtain) a grant (e.g., a triggering DCI) triggering the uplink data transmission. In some aspects, the grant may trigger the uplink data transmission using a plurality of transport blocks. In some examples, the grant may also identify or otherwise indicate a second MCS to be used for the uplink data transmission spanning the plurality of transport blocks. In some aspects, the grant may activate semi-persistent resources (e.g., CG/PG resources) for the uplink data transmission spanning multiple transport blocks.

Accordingly and at 535, UE 510 may transmit or otherwise convey (and base station 505 may receive or otherwise obtain) the uplink data transmission using the set of resources (e.g., the CG and/or PG semi-persistent resources) based on the grant. In this context, the set of resources for the uplink data transmission may span the plurality of transport blocks and may use the second MCS. In some aspects, the uplink transmission(s) performed at 520, 525, and/or 535 may be performed using various coverage enhancements, such as repetition, frequency hopping, DMRS bundling, and the like.

Figure 6:
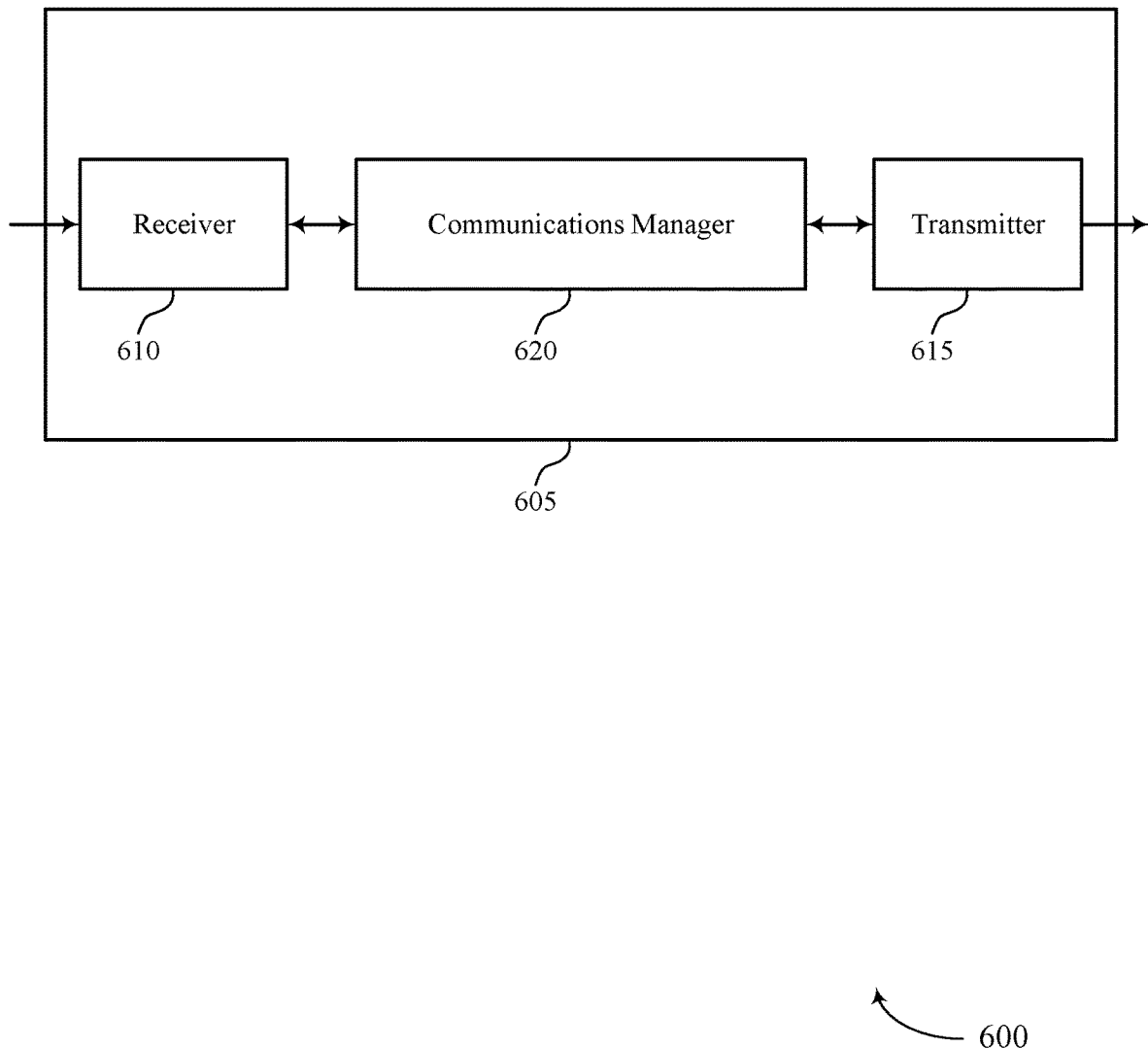
FIGS. 6 and 7 show block diagrams of devices that support latency reduction and coverage enhancement for extended reality in accordance with aspects of the present disclosure.

FIG. 6 shows a block diagram 600 of a device 605 that supports latency reduction and coverage enhancement for extended reality in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to latency reduction and coverage enhancement for extended reality). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to latency reduction and coverage enhancement for extended reality). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of latency reduction and coverage enhancement for extended reality as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for identifying a resource for a joint uplink transmission including a SRS and a SR. The communications manager 620 may be configured as or otherwise support a means for receiving a grant of a set of resources for an uplink data transmission to a base station. The communications manager 620 may be configured as or otherwise support a means for performing the joint uplink transmission including the SRS and the SR using the resource for the joint uplink transmission in connection with performing the uplink data transmission using the set of resources for the uplink data transmission.

Additionally or alternatively, the communications manager 620 may support wireless communications at a UE in accordance with examples as disclosed herein. For example, the communications manager 620 may be configured as or otherwise support a means for receiving a signal indicating a set of resources for an uplink data transmission, the signal further identifying a set of available first parameter values for the uplink data transmission. The communications manager 620 may be configured as or otherwise support a means for receiving a grant activating the set of resources for the uplink data transmission, the grant indicating a second parameter value for the uplink data transmission. The communications manager 620 may be configured as or otherwise support a means for determining a first parameter value for the uplink data transmission from the set of available first parameter values based on the second parameter value indicated in the grant. The communications manager 620 may be configured as or otherwise support a means for performing the uplink data transmission using the set of resources and according to the first parameter value and the second parameter value, where the first parameter value includes either a TBS parameter or a slot aggregation factor and the second parameter value include either the slot aggregation factor or the TBS parameter.

Additionally or alternatively, the communications manager 620 may support wireless communications at a UE in accordance with examples as disclosed herein. For example, the communications manager 620 may be configured as or otherwise support a means for transmitting an indication that uplink data is to be transmitted in an uplink data transmission. The communications manager 620 may be configured as or otherwise support a means for receiving, based on the indication, a grant triggering the uplink data transmission, where the grant triggers the uplink data transmission using a set of multiple transport blocks. The communications manager 620 may be configured as or otherwise support a means for performing the uplink data transmission using a set of resources and based on the grant, the set of resources spanning the set of multiple transport blocks.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improving extended uplink data transmissions by improving link adaptations, latency, and the like.

Figure 7:
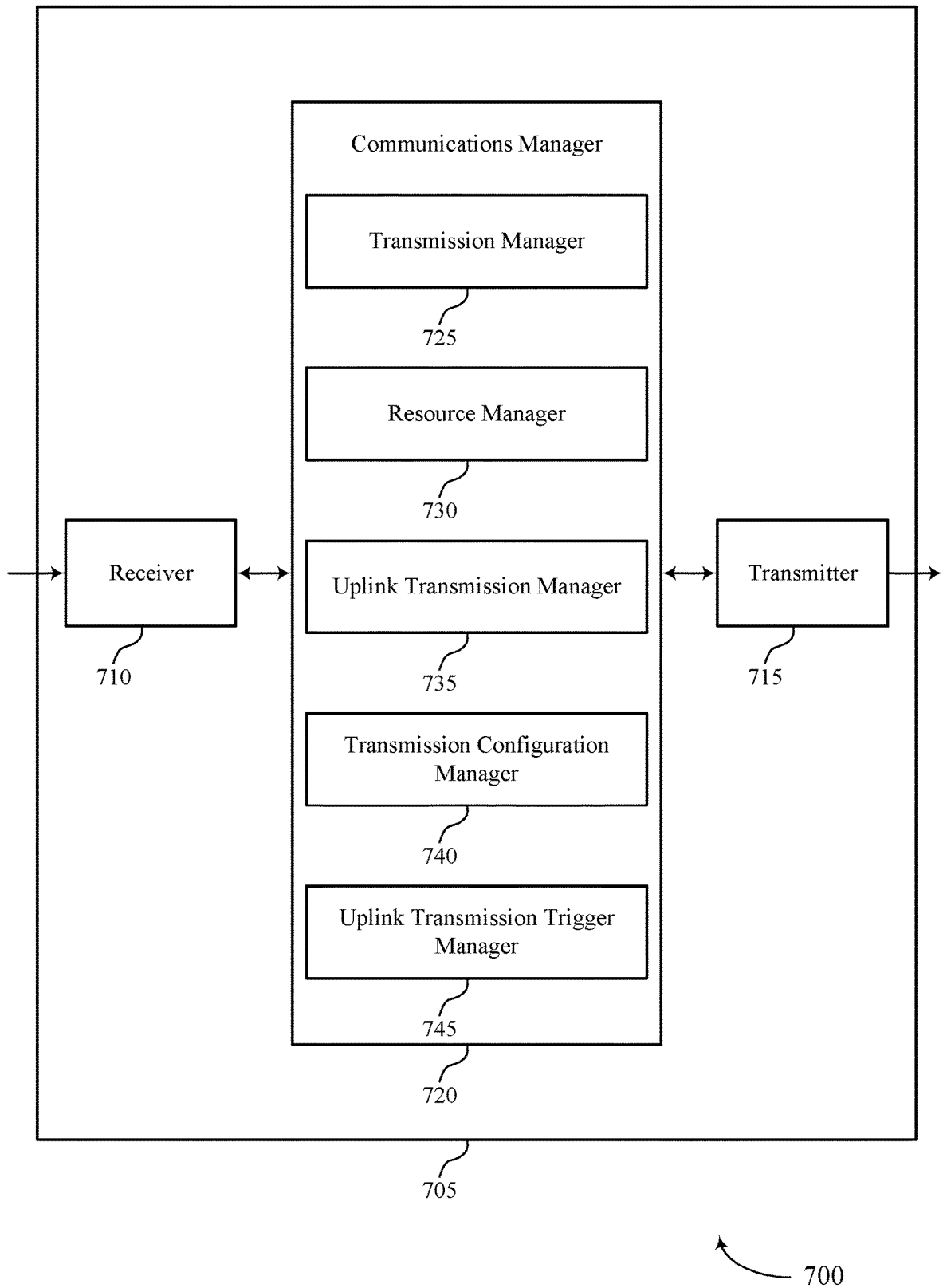

FIG. 7 shows a block diagram 700 of a device 705 that supports latency reduction and coverage enhancement for extended reality in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to latency reduction and coverage enhancement for extended reality). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to latency reduction and coverage enhancement for extended reality). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of latency reduction and coverage enhancement for extended reality as described herein. For example, the communications manager 720 may include a transmission manager 725, a resource manager 730, an uplink transmission manager 735, a transmission configuration manager 740, an uplink transmission trigger manager 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The transmission manager 725 may be configured as or otherwise support a means for identifying a resource for a joint uplink transmission including a SRS and a SR. The resource manager 730 may be configured as or otherwise support a means for receiving a grant of a set of resources for an uplink data transmission to a base station. The uplink transmission manager 735 may be configured as or otherwise support a means for performing the joint uplink transmission including the SRS and the SR using the resource for the joint uplink transmission in connection with performing the uplink data transmission using the set of resources for the uplink data transmission.

Additionally or alternatively, the communications manager 720 may support wireless communications at a UE in accordance with examples as disclosed herein. The resource manager 730 may be configured as or otherwise support a means for receiving a signal indicating a set of resources for an uplink data transmission, the signal further identifying a set of available first parameter values for the uplink data transmission. The resource manager 730 may be configured as or otherwise support a means for receiving a grant activating the set of resources for the uplink data transmission, the grant indicating a second parameter value for the uplink data transmission. The transmission configuration manager 740 may be configured as or otherwise support a means for determining a first parameter value for the uplink data transmission from the set of available first parameter values based on the second parameter value indicated in the grant. The uplink transmission manager 735 may be configured as or otherwise support a means for performing the uplink data transmission using the set of resources and according to the first parameter value and the second parameter value, where the first parameter value includes either a TBS parameter or a slot aggregation factor and the second parameter value include either the slot aggregation factor or the TBS parameter.

Additionally or alternatively, the communications manager 720 may support wireless communications at a UE in accordance with examples as disclosed herein. The uplink transmission trigger manager 745 may be configured as or otherwise support a means for transmitting an indication that uplink data is to be transmitted in an uplink data transmission. The resource manager 730 may be configured as or otherwise support a means for receiving, based on the indication, a grant triggering the uplink data transmission, where the grant triggers the uplink data transmission using a set of multiple transport blocks. The uplink transmission manager 735 may be configured as or otherwise support a means for performing the uplink data transmission using a set of resources and based on the grant, the set of resources spanning the set of multiple transport blocks.

Figure 8:
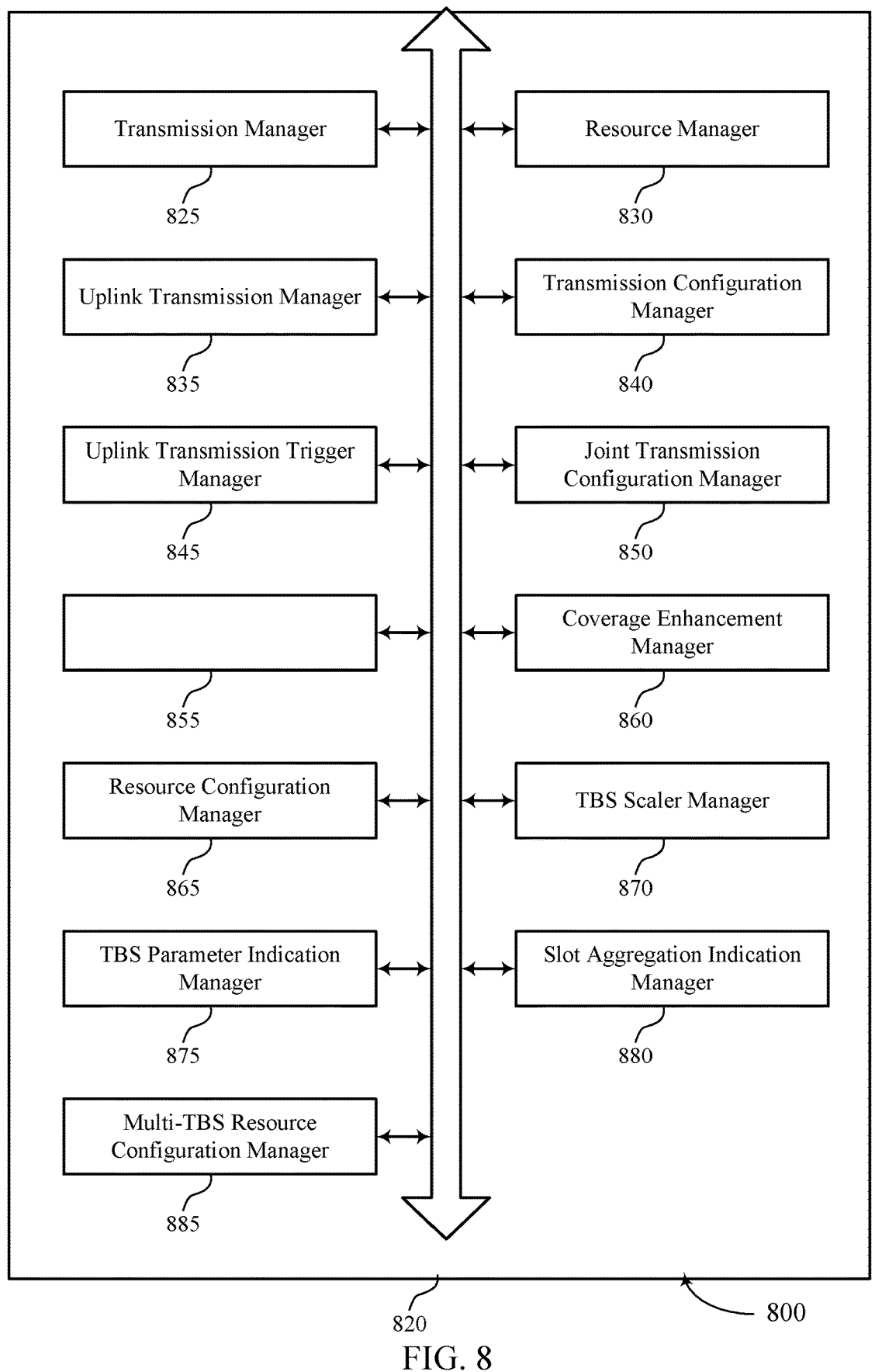
FIG. 8 shows a block diagram of a communications manager that supports latency reduction and coverage enhancement for extended reality in accordance with aspects of the present disclosure.

FIG. 8 shows a block diagram 800 of a communications manager 820 that supports latency reduction and coverage enhancement for extended reality in accordance with aspects of the present disclosure. The communications manager 820 may be an example of aspects of a communications manager 620, a communications manager 720, or both, as described herein. The communications manager 820, or various components thereof, may be an example of means for performing various aspects of latency reduction and coverage enhancement for extended reality as described herein. For example, the communications manager 820 may include a transmission manager 825, a resource manager 830, an uplink transmission manager 835, a transmission configuration manager 840, an uplink transmission trigger manager 845, a joint transmission configuration manager 850, a coverage enhancement manager 860, a resource configuration manager 865, a TBS scaler manager 870, a TBS parameter indication manager 875, a slot aggregation indication manager 880, a multi-TBS resource configuration manager 885, or any combination thereof. Each of these components may communicate, directly or indirectly, with one another (e.g., via one or more buses).

The communications manager 820 may support wireless communication at a UE in accordance with examples as disclosed herein. The transmission manager 825 may be configured as or otherwise support a means for identifying a resource for a joint uplink transmission including a SRS and a SR. The resource manager 830 may be configured as or otherwise support a means for receiving a grant of a set of resources for an uplink data transmission to a base station. The uplink transmission manager 835 may be configured as or otherwise support a means for performing the joint uplink transmission including the SRS and the SR using the resource for the joint uplink transmission in connection with performing the uplink data transmission using the set of resources for the uplink data transmission.

In some examples, to support performing the uplink data transmission and the joint uplink transmission, the joint transmission configuration manager 850 may be configured as or otherwise support a means for transmitting the uplink data transmission and the joint uplink transmission back-to-back according to a TDM technique and using one or more subcarriers.

In some examples, to support performing the uplink data transmission and the joint uplink transmission, the joint transmission configuration manager 850 may be configured as or otherwise support a means for multiplexing the uplink data transmission with the SR to obtain a multiplexed uplink transmission. In some examples, to support performing the uplink data transmission and the joint uplink transmission, the 855 may be configured as or otherwise support a means for transmitting the multiplexed uplink transmission and the SRS back-to-back according to a TDM technique and using one or more subcarriers.

In some examples, to support performing the uplink data transmission and the joint uplink transmission, the joint transmission configuration manager 850 may be configured as or otherwise support a means for applying a root sequence, a cyclic shift, or both, for the SRS, where the root sequence, the cyclic shift, or both, indicates the SR. In some examples, to support performing the uplink data transmission and the joint uplink transmission, the joint transmission configuration manager 850 may be configured as or otherwise support a means for transmitting the uplink data transmission and the SRS back-to-back according to a TDM technique and using one or more subcarriers.

In some examples, the coverage enhancement manager 860 may be configured as or otherwise support a means for identifying at least one of a repetition pattern, a frequency hopping pattern, a DMRS bundling, or a combination thereof, where the uplink data transmission, the joint uplink transmission, or both, are transmitted according to the repetition pattern, the frequency hopping pattern, the DMRS bundling, or a combination thereof.

In some examples, the resource configuration manager 865 may be configured as or otherwise support a means for receiving a signal indicating the resource for the joint uplink transmission.

In some examples, the signal includes at least one of the grant, an RRC signal, a MAC CE, a downlink control information, or a combination thereof.

Additionally or alternatively, the communications manager 820 may support wireless communications at a UE in accordance with examples as disclosed herein. In some examples, the resource manager 830 may be configured as or otherwise support a means for receiving a signal indicating a set of resources for an uplink data transmission, the signal further identifying a set of available first parameter values for the uplink data transmission. In some examples, the resource manager 830 may be configured as or otherwise support a means for receiving a grant activating the set of resources for the uplink data transmission, the grant indicating a second parameter value for the uplink data transmission. The transmission configuration manager 840 may be configured as or otherwise support a means for determining a first parameter value for the uplink data transmission from the set of available first parameter values based on the second parameter value indicated in the grant. In some examples, the uplink transmission manager 835 may be configured as or otherwise support a means for performing the uplink data transmission using the set of resources and according to the first parameter value and the second parameter value, where the first parameter value includes either a TBS parameter or a slot aggregation factor and the second parameter value include either the slot aggregation factor or the TBS parameter.

In some examples, the TBS scaler manager 870 may be configured as or otherwise support a means for identifying, based on the signal, a scaler associated with the TBS parameter. In some examples, the TBS scaler manager 870 may be configured as or otherwise support a means for identifying the slot aggregation factor for the uplink data transmission based on the scaler and the TBS parameter indicated in the grant.

In some examples, the TBS parameter indication manager 875 may be configured as or otherwise support a means for identifying the slot aggregation factor for the uplink data transmission based on the TBS parameter indicated in the grant and the set of available first parameter values indicated in the signal.

In some examples, the slot aggregation indication manager 880 may be configured as or otherwise support a means for identifying, based on the signal, a scaler associated with the slot aggregation factor. In some examples, the slot aggregation indication manager 880 may be configured as or otherwise support a means for identifying the TBS parameter for the uplink data transmission based on the scaler and the slot aggregation factor indicated in the grant.

In some examples, the resource configuration manager 865 may be configured as or otherwise support a means for identifying the TBS parameter for the uplink data transmission based on the slot aggregation factor indicated in the grant and the set of available first parameter values indicated in the signal.

Additionally or alternatively, the communications manager 820 may support wireless communications at a UE in accordance with examples as disclosed herein. The uplink transmission trigger manager 845 may be configured as or otherwise support a means for transmitting an indication that uplink data is to be transmitted in an uplink data transmission. In some examples, the resource manager 830 may be configured as or otherwise support a means for receiving, based on the indication, a grant triggering the uplink data transmission, where the grant triggers the uplink data transmission using a set of multiple transport blocks. In some examples, the uplink transmission manager 835 may be configured as or otherwise support a means for performing the uplink data transmission using a set of resources and based on the grant, the set of resources spanning the set of multiple transport blocks.

In some examples, the multi-TBS resource configuration manager 885 may be configured as or otherwise support a means for receiving a signal indicating the set of resources spanning the set of multiple transport blocks.

In some examples, the multi-TBS resource configuration manager 885 may be configured as or otherwise support a means for identifying the set of resources spanning the set of multiple transport blocks based on the grant.

In some examples, the coverage enhancement manager 860 may be configured as or otherwise support a means for identifying, based on the grant, at least one of a repetition pattern, a frequency hopping pattern, a demodulation reference signal bundling, or any combination thereof, where the uplink data transmission is performed according to the repetition pattern, the frequency hopping pattern, the demodulation reference signal bundling, or a combination thereof.

Figure 9:
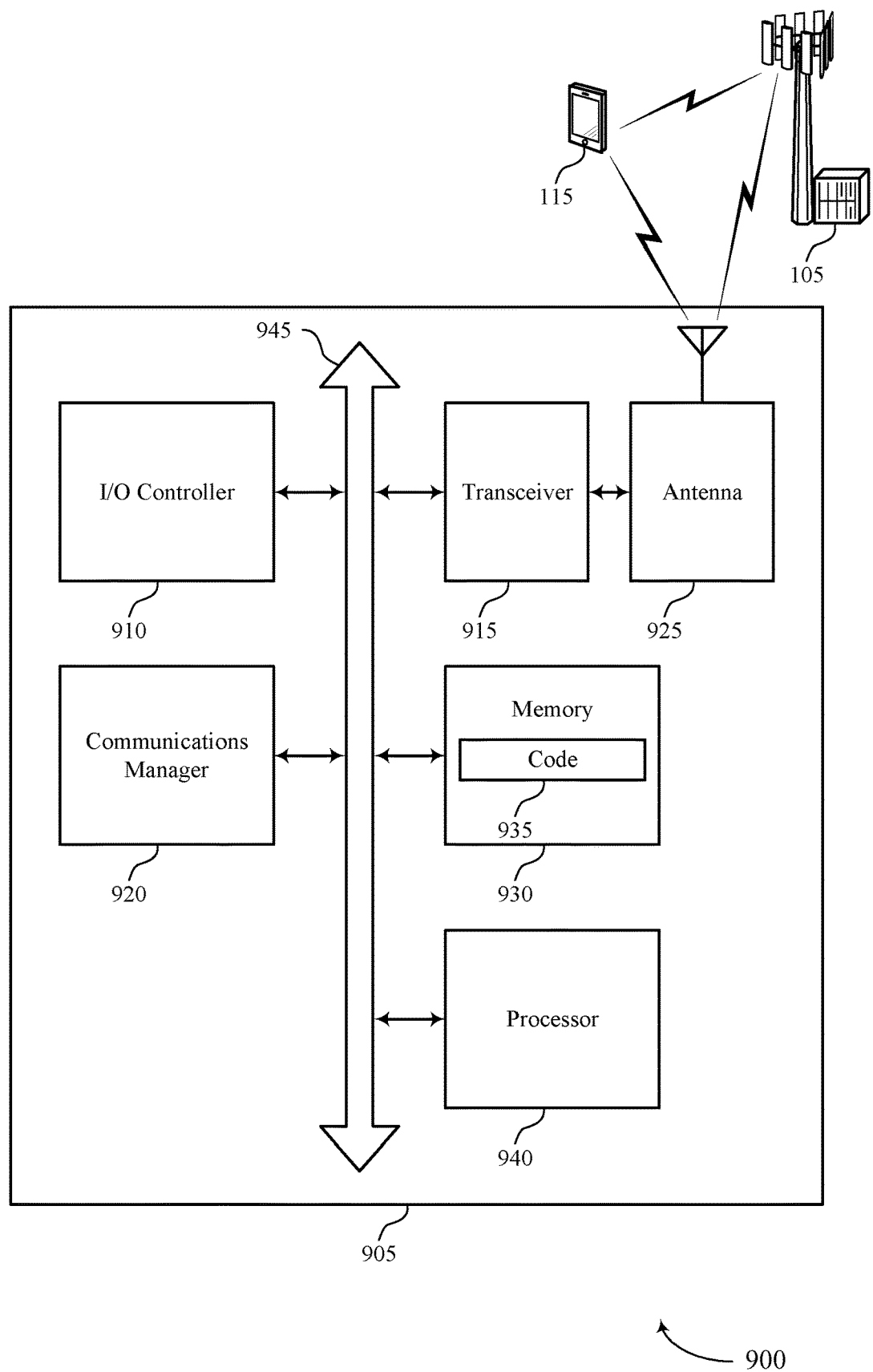
FIG. 9 shows a diagram of a system including a device that supports latency reduction and coverage enhancement for extended reality in accordance with aspects of the present disclosure.

FIG. 9 shows a diagram of a system 900 including a device 905 that supports latency reduction and coverage enhancement for extended reality in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting latency reduction and coverage enhancement for extended reality). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for identifying a resource for a joint uplink transmission including a SRS and a SR. The communications manager 920 may be configured as or otherwise support a means for receiving a grant of a set of resources for an uplink data transmission to a base station. The communications manager 920 may be configured as or otherwise support a means for performing the joint uplink transmission including the SRS and the SR using the resource for the joint uplink transmission in connection with performing the uplink data transmission using the set of resources for the uplink data transmission.

Additionally or alternatively, the communications manager 920 may support wireless communications at a UE in accordance with examples as disclosed herein. For example, the communications manager 920 may be configured as or otherwise support a means for receiving a signal indicating a set of resources for an uplink data transmission, the signal further identifying a set of available first parameter values for the uplink data transmission. The communications manager 920 may be configured as or otherwise support a means for receiving a grant activating the set of resources for the uplink data transmission, the grant indicating a second parameter value for the uplink data transmission. The communications manager 920 may be configured as or otherwise support a means for determining a first parameter value for the uplink data transmission from the set of available first parameter values based on the second parameter value indicated in the grant. The communications manager 920 may be configured as or otherwise support a means for performing the uplink data transmission using the set of resources and according to the first parameter value and the second parameter value, where the first parameter value includes either a TBS parameter or a slot aggregation factor and the second parameter value include either the slot aggregation factor or the TBS parameter.

Additionally or alternatively, the communications manager 920 may support wireless communications at a UE in accordance with examples as disclosed herein. For example, the communications manager 920 may be configured as or otherwise support a means for transmitting an indication that uplink data is to be transmitted in an uplink data transmission. The communications manager 920 may be configured as or otherwise support a means for receiving, based on the indication, a grant triggering the uplink data transmission, where the grant triggers the uplink data transmission using a set of multiple transport blocks. The communications manager 920 may be configured as or otherwise support a means for performing the uplink data transmission using a set of resources and based on the grant, the set of resources spanning the set of multiple transport blocks.

By including or configuring the communications manager 920 in accordance with examples as described herein, the device 905 may support techniques for improving extended uplink data transmissions by improving link adaptations, latency, and the like.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of latency reduction and coverage enhancement for extended reality as described herein, or the processor 940 and the memory 930 may be otherwise configured to perform or support such operations.

Figure 10:
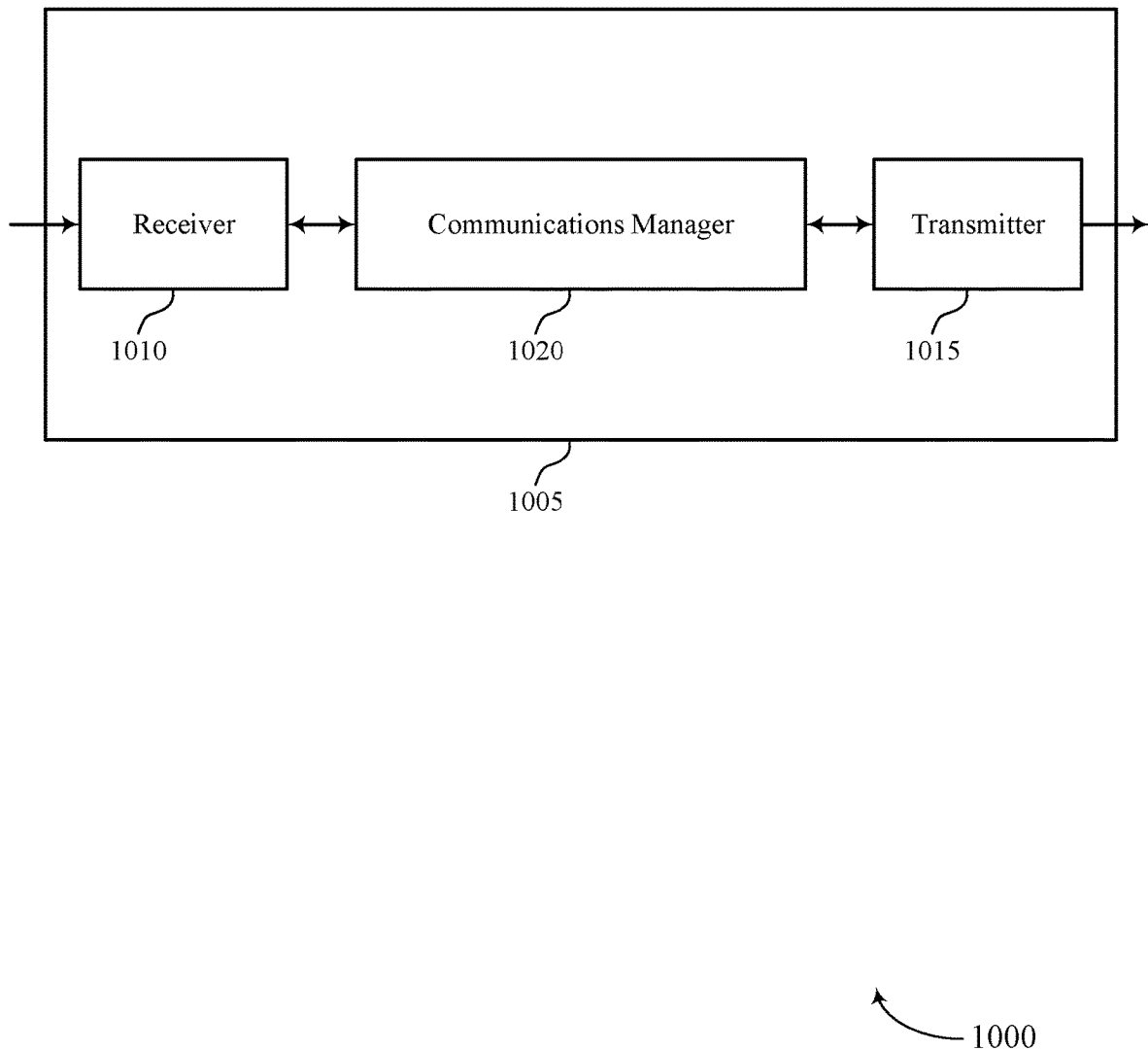
FIGS. 10 and 11 show block diagrams of devices that support latency reduction and coverage enhancement for extended reality in accordance with aspects of the present disclosure.

FIG. 10 shows a block diagram 1000 of a device 1005 that supports latency reduction and coverage enhancement for extended reality in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to latency reduction and coverage enhancement for extended reality). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to latency reduction and coverage enhancement for extended reality). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of latency reduction and coverage enhancement for extended reality as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for identifying a resource for a joint uplink transmission including a SRS and a SR. The communications manager 1020 may be configured as or otherwise support a means for transmitting a grant of a set of resources for an uplink data transmission from a UE. The communications manager 1020 may be configured as or otherwise support a means for performing the joint uplink transmission including the SRS and the SR using the resource for the joint uplink transmission in connection with performing the uplink data transmission using the set of resources for the uplink data transmission.

Additionally or alternatively, the communications manager 1020 may support wireless communications at a base station in accordance with examples as disclosed herein. For example, the communications manager 1020 may be configured as or otherwise support a means for transmitting a signal indicating a set of resources for an uplink data transmission, the signal further identifying a set of available first parameter values for the uplink data transmission. The communications manager 1020 may be configured as or otherwise support a means for determining a first parameter value for the uplink data transmission from the set of available first parameter values based on a second parameter value indicated in a grant. The communications manager 1020 may be configured as or otherwise support a means for transmitting the grant activating the set of resources for the uplink data transmission, the grant indicating the second parameter value for the uplink data transmission. The communications manager 1020 may be configured as or otherwise support a means for performing the uplink data transmission using the set of resources and according to the first parameter value and the second parameter value, where the first parameter value includes either a TBS parameter or a slot aggregation factor and the second parameter value include either the slot aggregation factor or the TBS parameter.

Additionally or alternatively, the communications manager 1020 may support wireless communications at a base station in accordance with examples as disclosed herein. For example, the communications manager 1020 may be configured as or otherwise support a means for receiving, from a UE, an indication that uplink data is to be transmitted in an uplink data transmission. The communications manager 1020 may be configured as or otherwise support a means for transmitting, based on the indication, a grant triggering the uplink data transmission, where the grant triggers the uplink data transmission using a set of multiple transport blocks. The communications manager 1020 may be configured as or otherwise support a means for performing the uplink data transmission using a set of resources and based on the grant, the set of resources spanning the set of multiple transport blocks.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for improving extended uplink data transmissions by improving link adaptations, latency, and the like.

Figure 11:
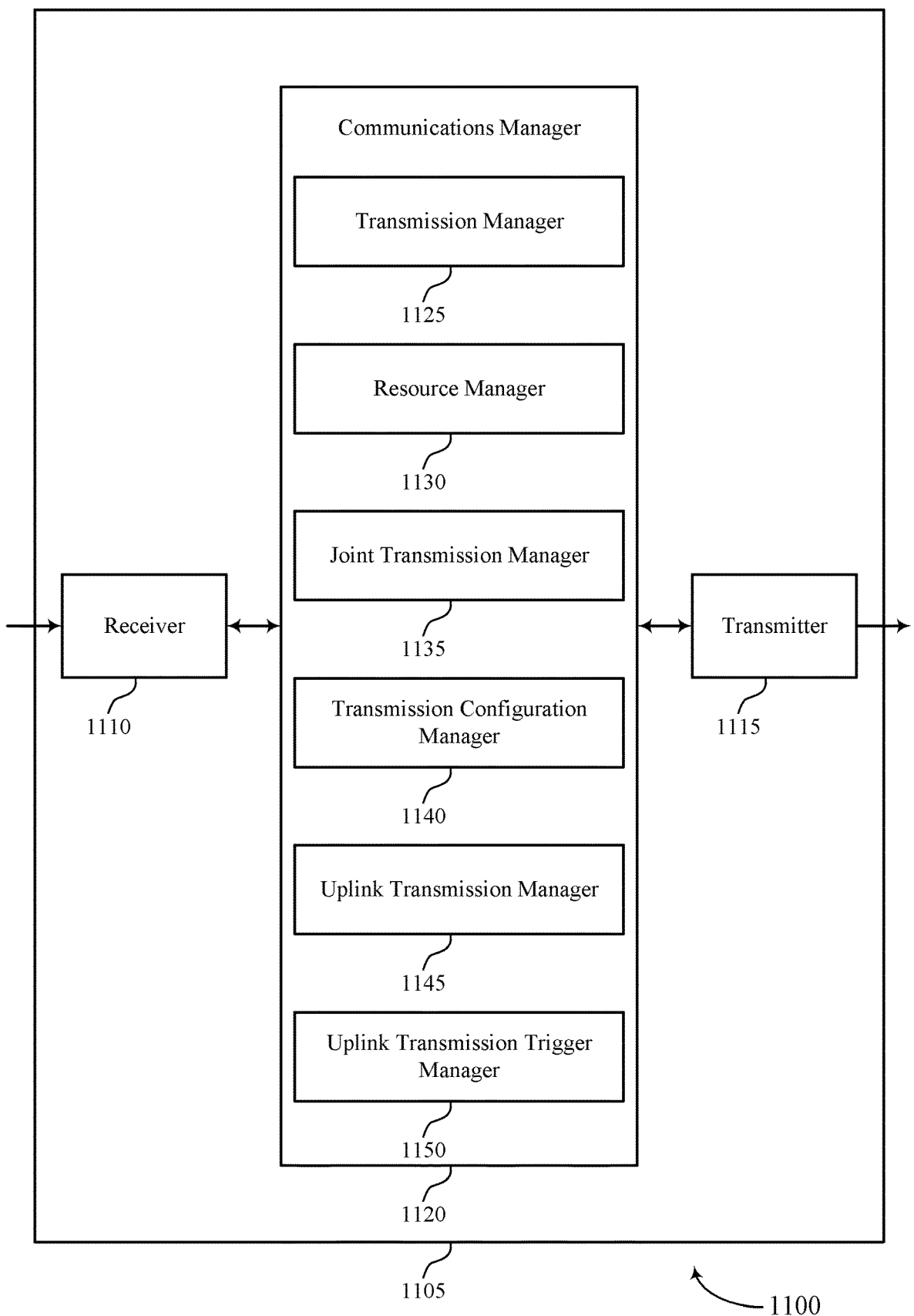

FIG. 11 shows a block diagram 1100 of a device 1105 that supports latency reduction and coverage enhancement for extended reality in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to latency reduction and coverage enhancement for extended reality). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to latency reduction and coverage enhancement for extended reality). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of latency reduction and coverage enhancement for extended reality as described herein. For example, the communications manager 1120 may include a transmission manager 1125, a resource manager 1130, a joint transmission manager 1135, a transmission configuration manager 1140, an uplink transmission manager 1145, an uplink transmission trigger manager 1150, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The transmission manager 1125 may be configured as or otherwise support a means for identifying a resource for a joint uplink transmission including a SRS and a SR. The resource manager 1130 may be configured as or otherwise support a means for transmitting a grant of a set of resources for an uplink data transmission from a UE. The joint transmission manager 1135 may be configured as or otherwise support a means for performing the joint uplink transmission including the SRS and the SR using the resource for the joint uplink transmission in connection with performing the uplink data transmission using the set of resources for the uplink data transmission.

Additionally or alternatively, the communications manager 1120 may support wireless communications at a base station in accordance with examples as disclosed herein. The resource manager 1130 may be configured as or otherwise support a means for transmitting a signal indicating a set of resources for an uplink data transmission, the signal further identifying a set of available first parameter values for the uplink data transmission. The resource manager 1130 may be configured as or otherwise support a means for determining a first parameter value for the uplink data transmission from the set of available first parameter values based on a second parameter value indicated in a grant. The transmission configuration manager 1140 may be configured as or otherwise support a means for transmitting the grant activating the set of resources for the uplink data transmission, the grant indicating the second parameter value for the uplink data transmission. The uplink transmission manager 1145 may be configured as or otherwise support a means for performing the uplink data transmission using the set of resources and according to the first parameter value and the second parameter value, where the first parameter value includes either a TBS parameter or a slot aggregation factor and the second parameter value include either the slot aggregation factor or the TBS parameter.

Additionally or alternatively, the communications manager 1120 may support wireless communications at a base station in accordance with examples as disclosed herein. The resource manager 1130 may be configured as or otherwise support a means for receiving, from a UE, an indication that uplink data is to be transmitted in an uplink data transmission. The uplink transmission trigger manager 1150 may be configured as or otherwise support a means for transmitting, based on the indication, a grant triggering the uplink data transmission, where the grant triggers the uplink data transmission using a set of multiple transport blocks. The uplink transmission manager 1145 may be configured as or otherwise support a means for performing the uplink data transmission using a set of resources and based on the grant, the set of resources spanning the set of multiple transport blocks.

Figure 12:
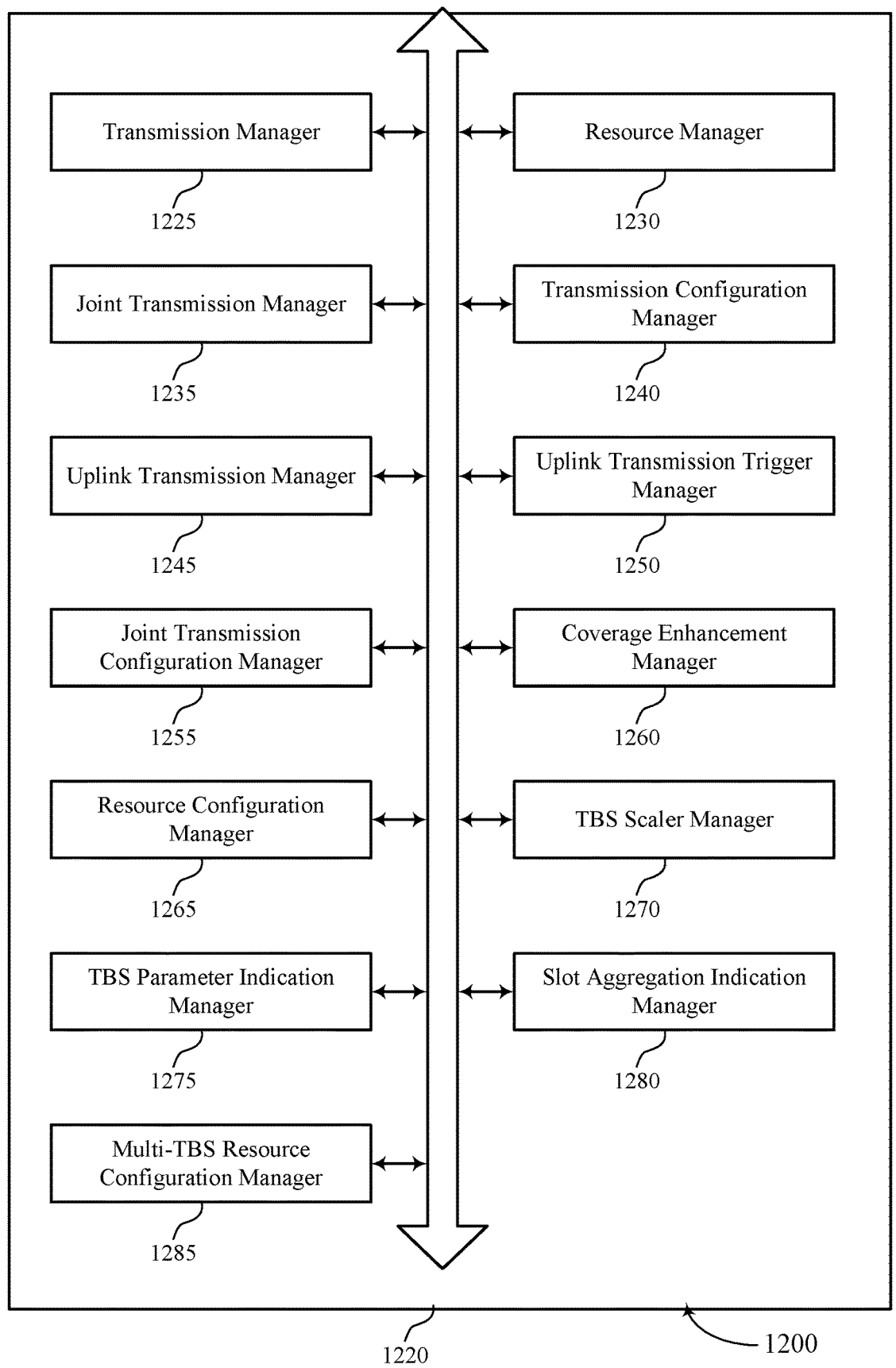
FIG. 12 shows a block diagram of a communications manager that supports latency reduction and coverage enhancement for extended reality in accordance with aspects of the present disclosure.

FIG. 12 shows a block diagram 1200 of a communications manager 1220 that supports latency reduction and coverage enhancement for extended reality in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of latency reduction and coverage enhancement for extended reality as described herein. For example, the communications manager 1220 may include a transmission manager 1225, a resource manager 1230, a joint transmission manager 1235, a transmission configuration manager 1240, an uplink transmission manager 1245, an uplink transmission trigger manager 1250, a joint transmission configuration manager 1255, a coverage enhancement manager 1260, a resource configuration manager 1265, a TBS scaler manager 1270, a TBS parameter indication manager 1275, a slot aggregation indication manager 1280, a multi-TBS resource configuration manager 1285, or any combination thereof. Each of these components may communicate, directly or indirectly, with one another (e.g., via one or more buses).

The communications manager 1220 may support wireless communication at a base station in accordance with examples as disclosed herein. The transmission manager 1225 may be configured as or otherwise support a means for identifying a resource for a joint uplink transmission including a SRS and a SR. The resource manager 1230 may be configured as or otherwise support a means for transmitting a grant of a set of resources for an uplink data transmission from a UE. The joint transmission manager 1235 may be configured as or otherwise support a means for performing the joint uplink transmission including the SRS and the SR using the resource for the joint uplink transmission in connection with performing the uplink data transmission using the set of resources for the uplink data transmission.

In some examples, to support performing the uplink data transmission and the joint uplink transmission, the joint transmission configuration manager 1255 may be configured as or otherwise support a means for receiving the uplink data transmission and the joint uplink transmission back-to-back according to a TDM technique and using one or more subcarriers.

In some examples, to support performing the uplink data transmission and the joint uplink transmission, the joint transmission configuration manager 1255 may be configured as or otherwise support a means for receiving a multiplexed uplink transmission and the SRS back-to-back according to a TDM technique and using one or more subcarriers, the multiplexed uplink transmission including the uplink data transmission multiplexed with the SR.

In some examples, to support performing the uplink data transmission and the joint uplink transmission, the joint transmission configuration manager 1255 may be configured as or otherwise support a means for receiving the uplink data transmission and the SRS back-to-back according to a TDM technique and using one or more subcarriers. In some examples, to support performing the uplink data transmission and the joint uplink transmission, the joint transmission configuration manager 1255 may be configured as or otherwise support a means for identifying the SR based on a root sequence, a cyclic shift, or both, applied to the SRS.

In some examples, the coverage enhancement manager 1260 may be configured as or otherwise support a means for identifying at least one of a repetition pattern, a frequency hopping pattern, a DMRS bundling, or a combination thereof, where the uplink data transmission, the joint uplink transmission, or both, are received according to the repetition pattern, the frequency hopping pattern, the DMRS bundling, or a combination thereof.

In some examples, the resource configuration manager 1265 may be configured as or otherwise support a means for transmitting a signal indicating the resource for the joint uplink transmission.

In some examples, the signal includes at least one of the grant, an RRC signal, a MAC CE, a downlink control information, or a combination thereof.

Additionally or alternatively, the communications manager 1220 may support wireless communications at a base station in accordance with examples as disclosed herein. In some examples, the resource manager 1230 may be configured as or otherwise support a means for transmitting a signal indicating a set of resources for an uplink data transmission, the signal further identifying a set of available first parameter values for the uplink data transmission. In some examples, the resource manager 1230 may be configured as or otherwise support a means for determining a first parameter value for the uplink data transmission from the set of available first parameter values based on a second parameter value indicated in a grant. The transmission configuration manager 1240 may be configured as or otherwise support a means for transmitting the grant activating the set of resources for the uplink data transmission, the grant indicating the second parameter value for the uplink data transmission. The uplink transmission manager 1245 may be configured as or otherwise support a means for performing the uplink data transmission using the set of resources and according to the first parameter value and the second parameter value, where the first parameter value includes either a TBS parameter or a slot aggregation factor and the second parameter value include either the slot aggregation factor or the TBS parameter.

In some examples, the TBS scaler manager 1270 may be configured as or otherwise support a means for identifying, based on the signal, a scaler associated with the TBS parameter. In some examples, the TBS scaler manager 1270 may be configured as or otherwise support a means for identifying the slot aggregation factor for the uplink data transmission based on the scaler and the TBS parameter indicated in the grant.

In some examples, the TBS parameter indication manager 1275 may be configured as or otherwise support a means for identifying the slot aggregation factor for the uplink data transmission based on the TBS parameter indicated in the grant and the set of available first parameter values indicated in the signal.

In some examples, the slot aggregation indication manager 1280 may be configured as or otherwise support a means for identifying, based on the signal, a scaler associated with the slot aggregation factor. In some examples, the slot aggregation indication manager 1280 may be configured as or otherwise support a means for identifying the TBS parameter for the uplink data transmission based on the scaler and the slot aggregation factor indicated in the grant.

In some examples, the slot aggregation indication manager 1280 may be configured as or otherwise support a means for identifying the TBS parameter for the uplink data transmission based on the slot aggregation factor indicated in the grant and the set of available first parameter values indicated in the signal.

Additionally or alternatively, the communications manager 1220 may support wireless communications at a base station in accordance with examples as disclosed herein. In some examples, the resource manager 1230 may be configured as or otherwise support a means for receiving, from a UE, an indication that uplink data is to be transmitted in an uplink data transmission. The uplink transmission trigger manager 1250 may be configured as or otherwise support a means for transmitting, based on the indication, a grant triggering the uplink data transmission, where the grant triggers the uplink data transmission using a set of multiple transport blocks. In some examples, the uplink transmission manager 1245 may be configured as or otherwise support a means for performing the uplink data transmission using a set of resources and based on the grant, the set of resources spanning the set of multiple transport blocks.

In some examples, the multi-TBS resource configuration manager 1285 may be configured as or otherwise support a means for transmitting a signal indicating the set of resources spanning the set of multiple transport blocks.

In some examples, the multi-TBS resource configuration manager 1285 may be configured as or otherwise support a means for identifying the set of resources spanning the set of multiple transport blocks based on the grant.

In some examples, the coverage enhancement manager 1260 may be configured as or otherwise support a means for identifying, based on the grant, at least one of a repetition pattern, a frequency hopping pattern, a demodulation reference signal bundling, or any combination thereof, where the uplink data transmission is performed according to the repetition pattern, the frequency hopping pattern, the demodulation reference signal bundling, or a combination thereof.

Figure 13:
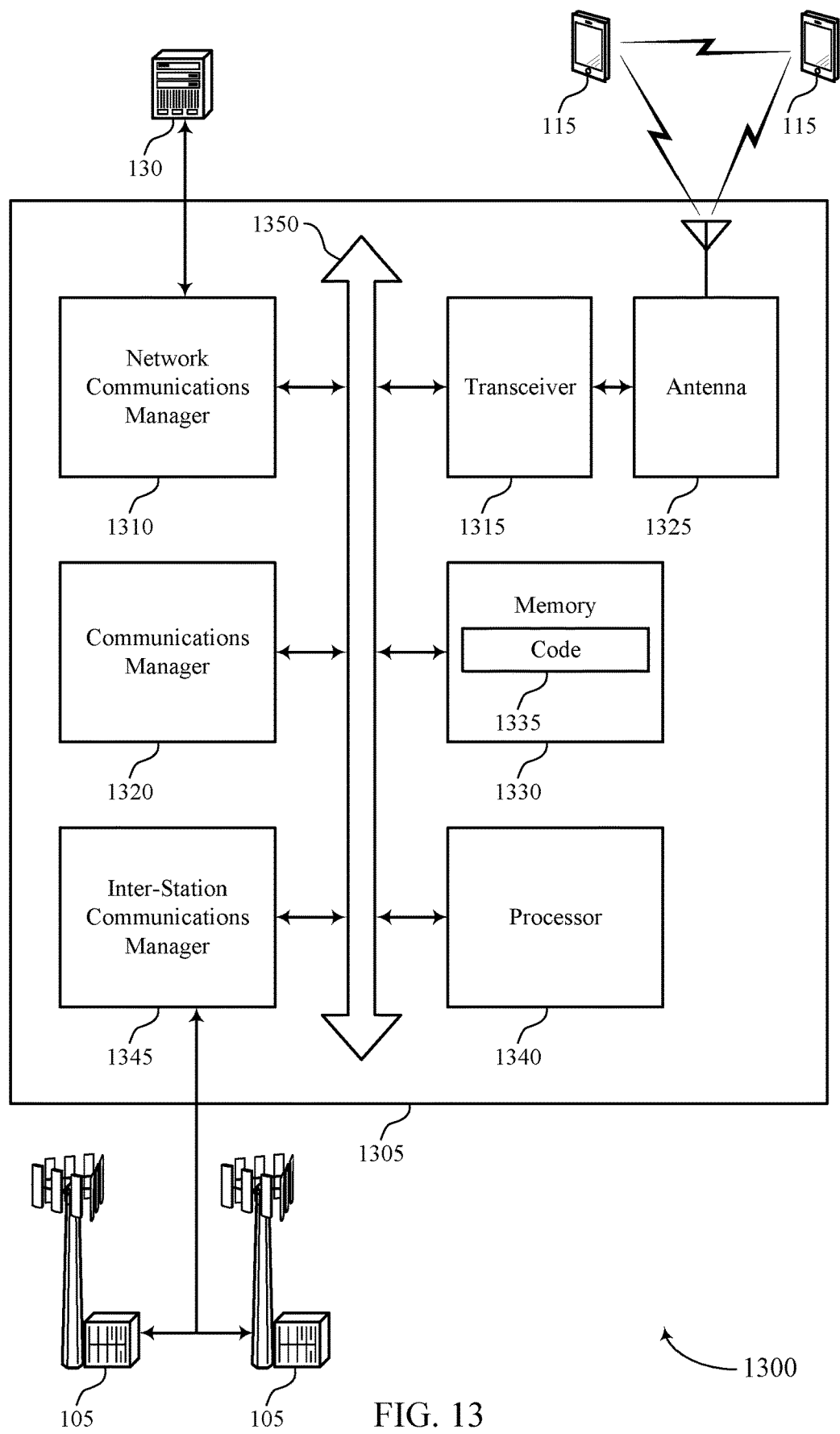
FIG. 13 shows a diagram of a system including a device that supports latency reduction and coverage enhancement for extended reality in accordance with aspects of the present disclosure.

FIG. 13 shows a diagram of a system 1300 including a device 1305 that supports latency reduction and coverage enhancement for extended reality in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting latency reduction and coverage enhancement for extended reality). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for identifying a resource for a joint uplink transmission including a SRS and a SR. The communications manager 1320 may be configured as or otherwise support a means for transmitting a grant of a set of resources for an uplink data transmission from a UE. The communications manager 1320 may be configured as or otherwise support a means for performing the joint uplink transmission including the SRS and the SR using the resource for the joint uplink transmission in connection with performing the uplink data transmission using the set of resources for the uplink data transmission.

Additionally or alternatively, the communications manager 1320 may support wireless communications at a base station in accordance with examples as disclosed herein. For example, the communications manager 1320 may be configured as or otherwise support a means for transmitting a signal indicating a set of resources for an uplink data transmission, the signal further identifying a set of available first parameter values for the uplink data transmission. The communications manager 1320 may be configured as or otherwise support a means for determining a first parameter value for the uplink data transmission from the set of available first parameter values based on a second parameter value indicated in a grant. The communications manager 1320 may be configured as or otherwise support a means for transmitting the grant activating the set of resources for the uplink data transmission, the grant indicating the second parameter value for the uplink data transmission. The communications manager 1320 may be configured as or otherwise support a means for performing the uplink data transmission using the set of resources and according to the first parameter value and the second parameter value, where the first parameter value includes either a TBS parameter or a slot aggregation factor and the second parameter value include either the slot aggregation factor or the TBS parameter.

Additionally or alternatively, the communications manager 1320 may support wireless communications at a base station in accordance with examples as disclosed herein. For example, the communications manager 1320 may be configured as or otherwise support a means for receiving, from a UE, an indication that uplink data is to be transmitted in an uplink data transmission. The communications manager 1320 may be configured as or otherwise support a means for transmitting, based on the indication, a grant triggering the uplink data transmission, where the grant triggers the uplink data transmission using a set of multiple transport blocks. The communications manager 1320 may be configured as or otherwise support a means for performing the uplink data transmission using a set of resources and based on the grant, the set of resources spanning the set of multiple transport blocks.

By including or configuring the communications manager 1320 in accordance with examples as described herein, the device 1305 may support techniques for improving extended uplink data transmissions by improving link adaptations, latency, and the like.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of latency reduction and coverage enhancement for extended reality as described herein, or the processor 1340 and the memory 1330 may be otherwise configured to perform or support such operations.

Figure 14:
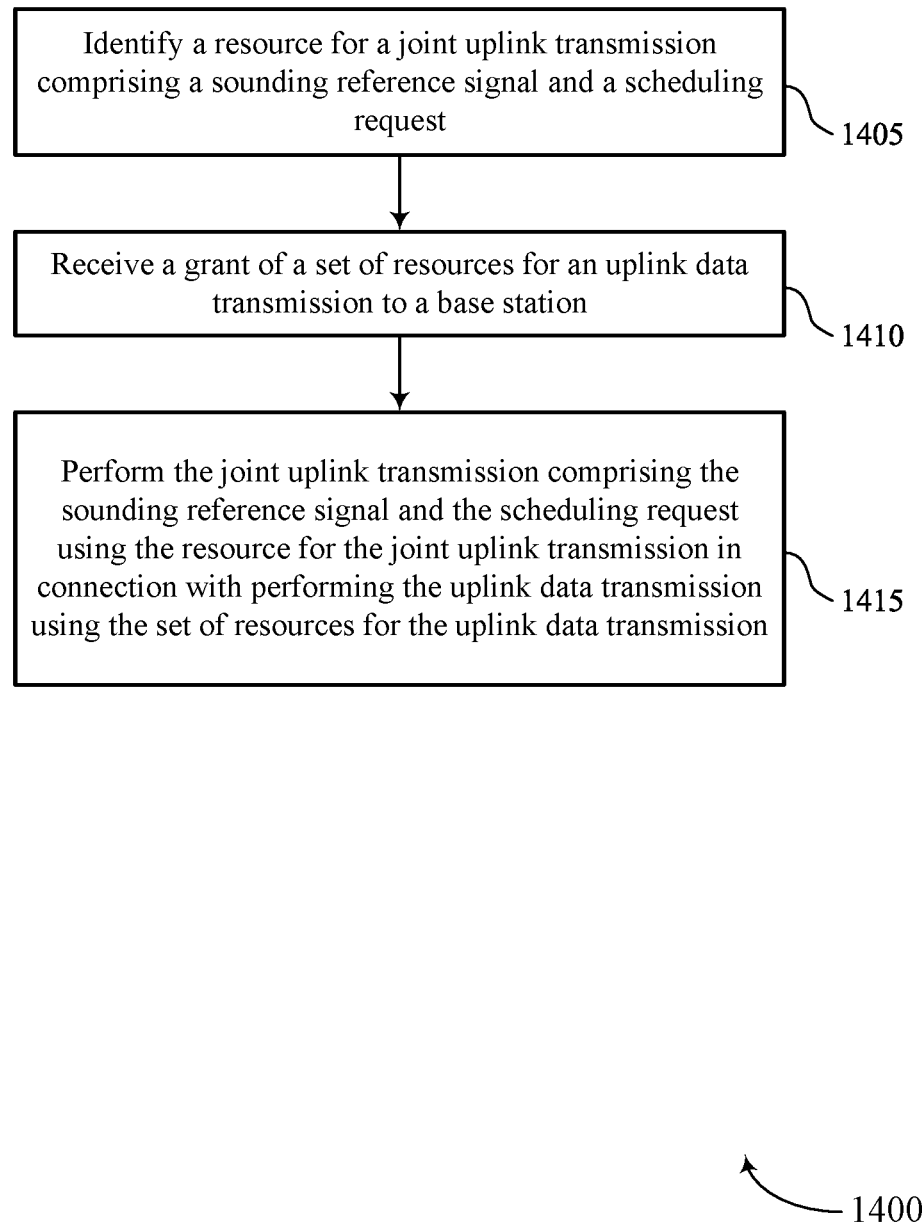
FIGS. 14 through 19 show flowcharts illustrating methods that support latency reduction and coverage enhancement for extended reality in accordance with aspects of the present disclosure.

FIG. 14 shows a flowchart illustrating a method 1400 that supports latency reduction and coverage enhancement for extended reality in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include identifying a resource for a joint uplink transmission including a SRS and a SR. The operations of 1405 may be performed in accordance with examples as disclosed herein. In some examples, aspects of the operations of 1405 may be performed by a transmission manager 825 as described with reference to FIG. 8.

At 1410, the method may include receiving a grant of a set of resources for an uplink data transmission to a base station. The operations of 1410 may be performed in accordance with examples as disclosed herein. In some examples, aspects of the operations of 1410 may be performed by a resource manager 830 as described with reference to FIG. 8.

At 1415, the method may include performing the joint uplink transmission including the SRS and the SR using the resource for the joint uplink transmission in connection with performing the uplink data transmission using the set of resources for the uplink data transmission. The operations of 1415 may be performed in accordance with examples as disclosed herein. In some examples, aspects of the operations of 1415 may be performed by an uplink transmission manager 835 as described with reference to FIG. 8.

Figure 15:
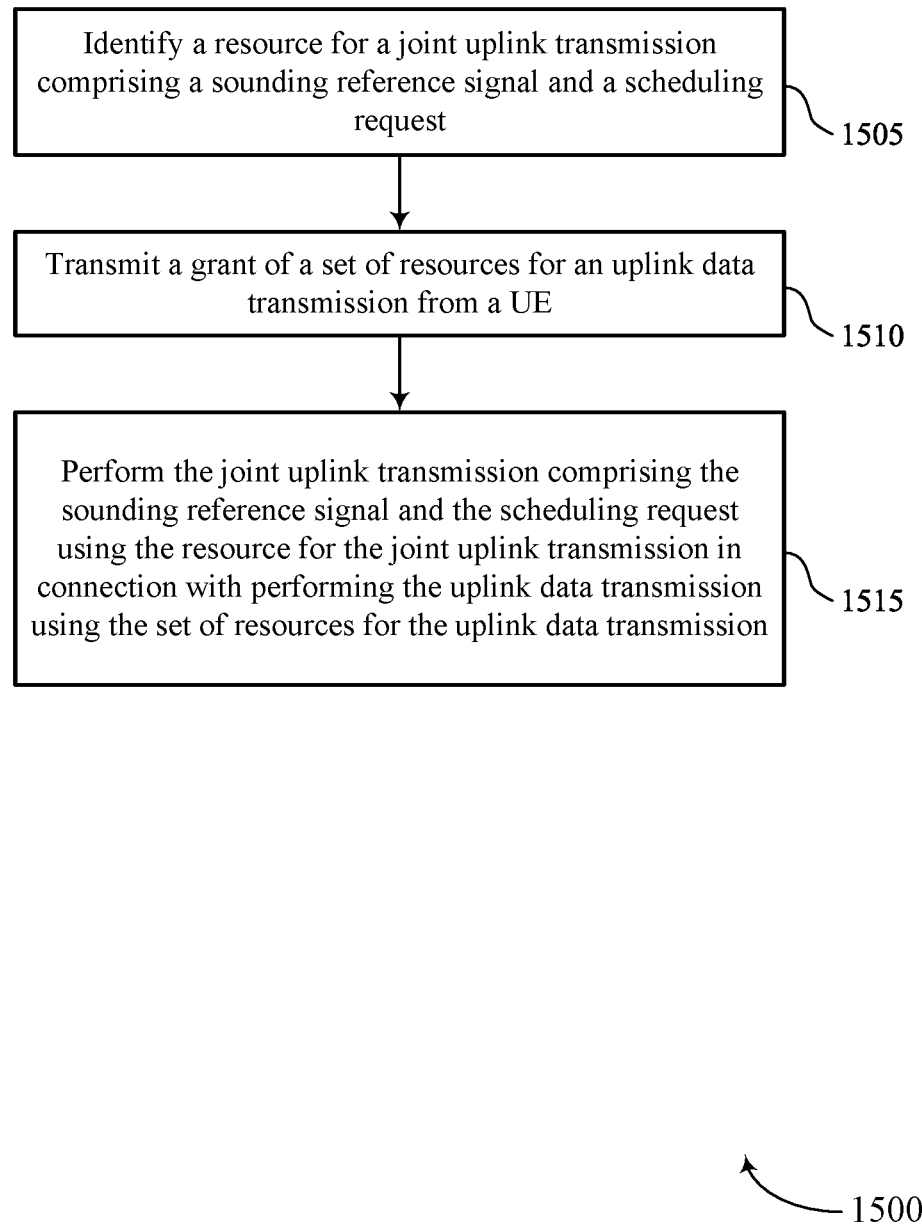

FIG. 15 shows a flowchart illustrating a method 1500 that supports latency reduction and coverage enhancement for extended reality in accordance with aspects of the present disclosure. The operations of the method 1500 may be implemented by a base station or its components as described herein. For example, the operations of the method 1500 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1505, the method may include identifying a resource for a joint uplink transmission including a SRS and a SR. The operations of 1505 may be performed in accordance with examples as disclosed herein. In some examples, aspects of the operations of 1505 may be performed by a transmission manager 1225 as described with reference to FIG. 12.

At 1510, the method may include transmitting a grant of a set of resources for an uplink data transmission from a UE. The operations of 1510 may be performed in accordance with examples as disclosed herein. In some examples, aspects of the operations of 1510 may be performed by a resource manager 1230 as described with reference to FIG. 12.

At 1515, the method may include performing the joint uplink transmission including the SRS and the SR using the resource for the joint uplink transmission in connection with performing the uplink data transmission using the set of resources for the uplink data transmission. The operations of 1515 may be performed in accordance with examples as disclosed herein. In some examples, aspects of the operations of 1515 may be performed by a joint transmission manager 1235 as described with reference to FIG. 12.

Figure 16:
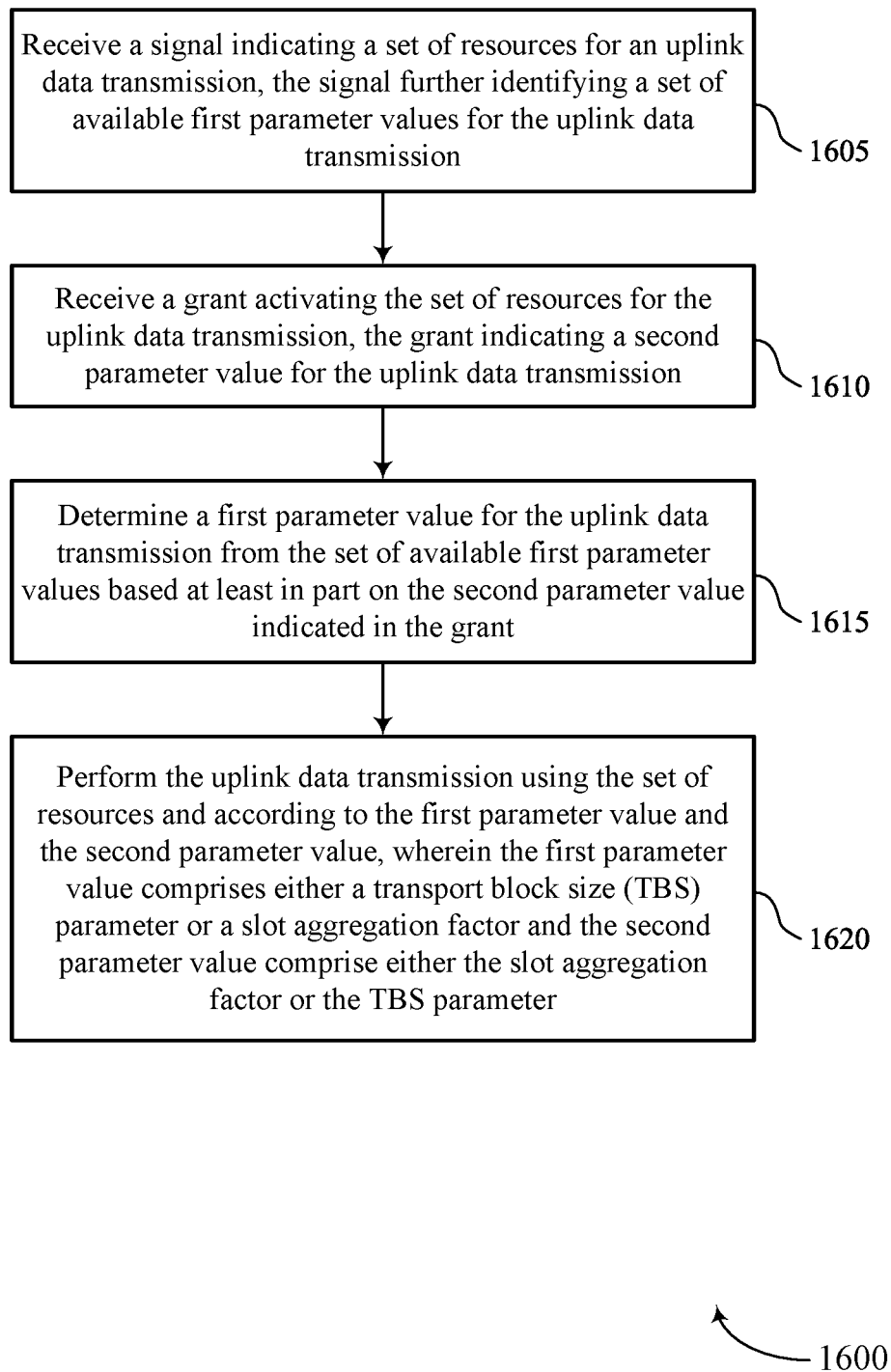

FIG. 16 shows a flowchart illustrating a method 1600 that supports latency reduction and coverage enhancement for extended reality in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving a signal indicating a set of resources for an uplink data transmission, the signal further identifying a set of available first parameter values for the uplink data transmission. The operations of 1605 may be performed in accordance with examples as disclosed herein. In some examples, aspects of the operations of 1605 may be performed by a resource manager 830 as described with reference to FIG. 8.

At 1610, the method may include receiving a grant activating the set of resources for the uplink data transmission, the grant indicating a second parameter value for the uplink data transmission. The operations of 1610 may be performed in accordance with examples as disclosed herein. In some examples, aspects of the operations of 1610 may be performed by a resource manager 830 as described with reference to FIG. 8.

At 1615, the method may include determining a first parameter value for the uplink data transmission from the set of available first parameter values based on the second parameter value indicated in the grant. The operations of 1615 may be performed in accordance with examples as disclosed herein. In some examples, aspects of the operations of 1615 may be performed by a transmission configuration manager 840 as described with reference to FIG. 8.

At 1620, the method may include performing the uplink data transmission using the set of resources and according to the first parameter value and the second parameter value, where the first parameter value includes either a TB S parameter or a slot aggregation factor and the second parameter value include either the slot aggregation factor or the TBS parameter. The operations of 1620 may be performed in accordance with examples as disclosed herein. In some examples, aspects of the operations of 1620 may be performed by an uplink transmission manager 835 as described with reference to FIG. 8.

Figure 17:
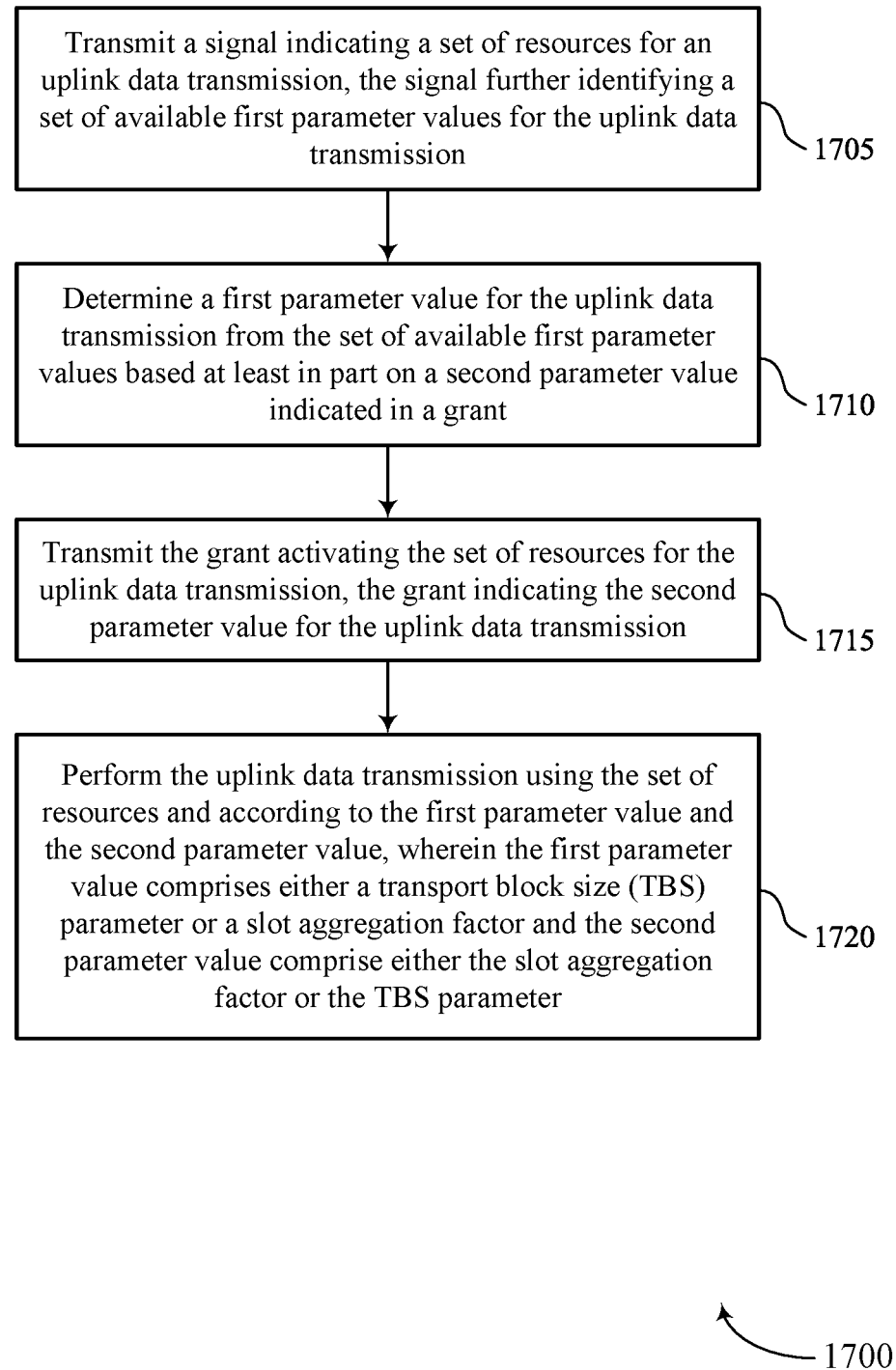

FIG. 17 shows a flowchart illustrating a method 1700 that supports latency reduction and coverage enhancement for extended reality in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting a signal indicating a set of resources for an uplink data transmission, the signal further identifying a set of available first parameter values for the uplink data transmission. The operations of 1705 may be performed in accordance with examples as disclosed herein. In some examples, aspects of the operations of 1705 may be performed by a resource manager 1230 as described with reference to FIG. 12.

At 1710, the method may include determining a first parameter value for the uplink data transmission from the set of available first parameter values based on a second parameter value indicated in a grant. The operations of 1710 may be performed in accordance with examples as disclosed herein. In some examples, aspects of the operations of 1710 may be performed by a resource manager 1230 as described with reference to FIG. 12.

At 1715, the method may include transmitting the grant activating the set of resources for the uplink data transmission, the grant indicating the second parameter value for the uplink data transmission. The operations of 1715 may be performed in accordance with examples as disclosed herein. In some examples, aspects of the operations of 1715 may be performed by a transmission configuration manager 1240 as described with reference to FIG. 12.

At 1720, the method may include performing the uplink data transmission using the set of resources and according to the first parameter value and the second parameter value, where the first parameter value includes either a TB S parameter or a slot aggregation factor and the second parameter value include either the slot aggregation factor or the TBS parameter. The operations of 1720 may be performed in accordance with examples as disclosed herein. In some examples, aspects of the operations of 1720 may be performed by an uplink transmission manager 1245 as described with reference to FIG. 12.

Figure 18:
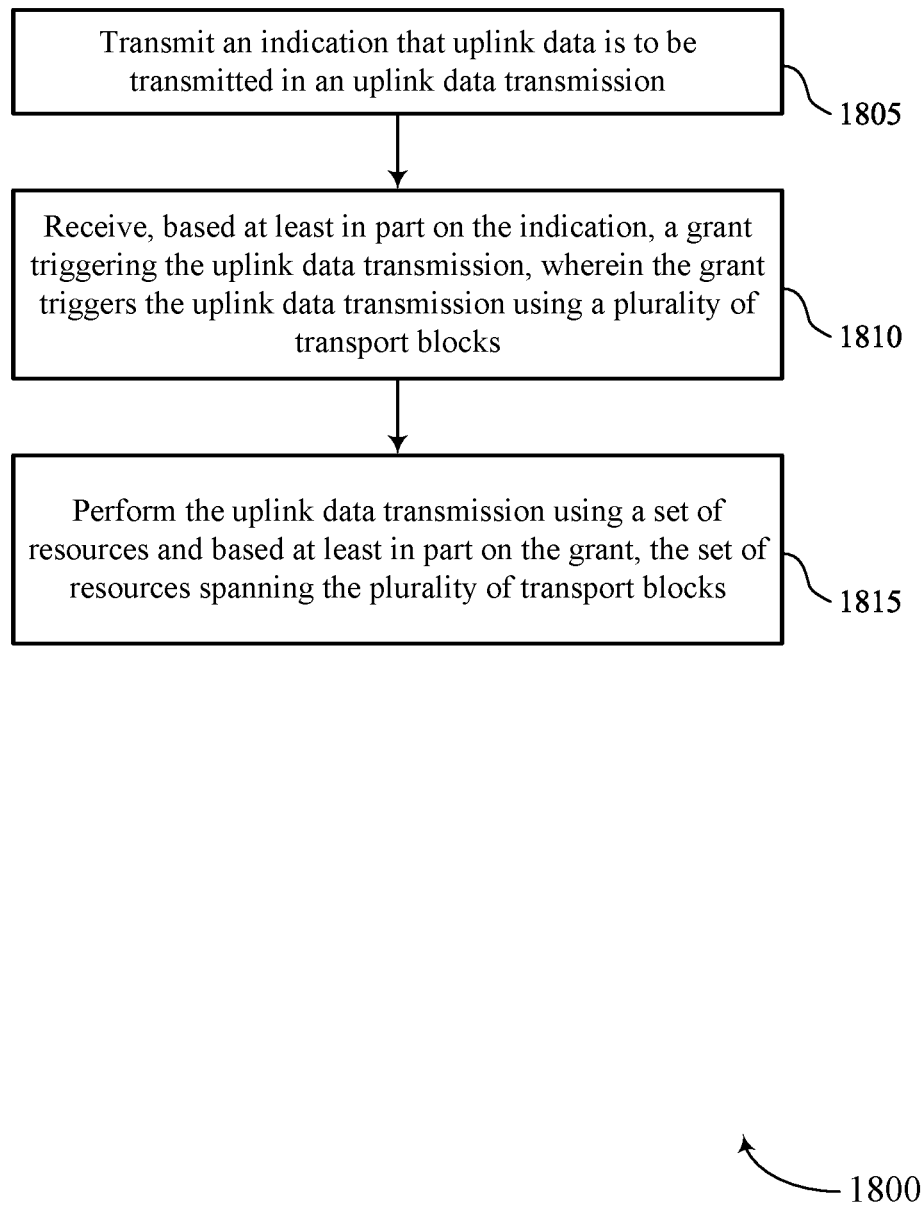

FIG. 18 shows a flowchart illustrating a method 1800 that supports latency reduction and coverage enhancement for extended reality in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include transmitting an indication that uplink data is to be transmitted in an uplink data transmission. The operations of 1805 may be performed in accordance with examples as disclosed herein. In some examples, aspects of the operations of 1805 may be performed by an uplink transmission trigger manager 845 as described with reference to FIG. 8.

At 1810, the method may include receiving, based on the indication, a grant triggering the uplink data transmission, where the grant triggers the uplink data transmission using a set of multiple transport blocks. The operations of 1810 may be performed in accordance with examples as disclosed herein. In some examples, aspects of the operations of 1810 may be performed by a resource manager 830 as described with reference to FIG. 8.

At 1815, the method may include performing the uplink data transmission using a set of resources and based on the grant, the set of resources spanning the set of multiple transport blocks. The operations of 1815 may be performed in accordance with examples as disclosed herein. In some examples, aspects of the operations of 1815 may be performed by an uplink transmission manager 835 as described with reference to FIG. 8.

Figure 19:
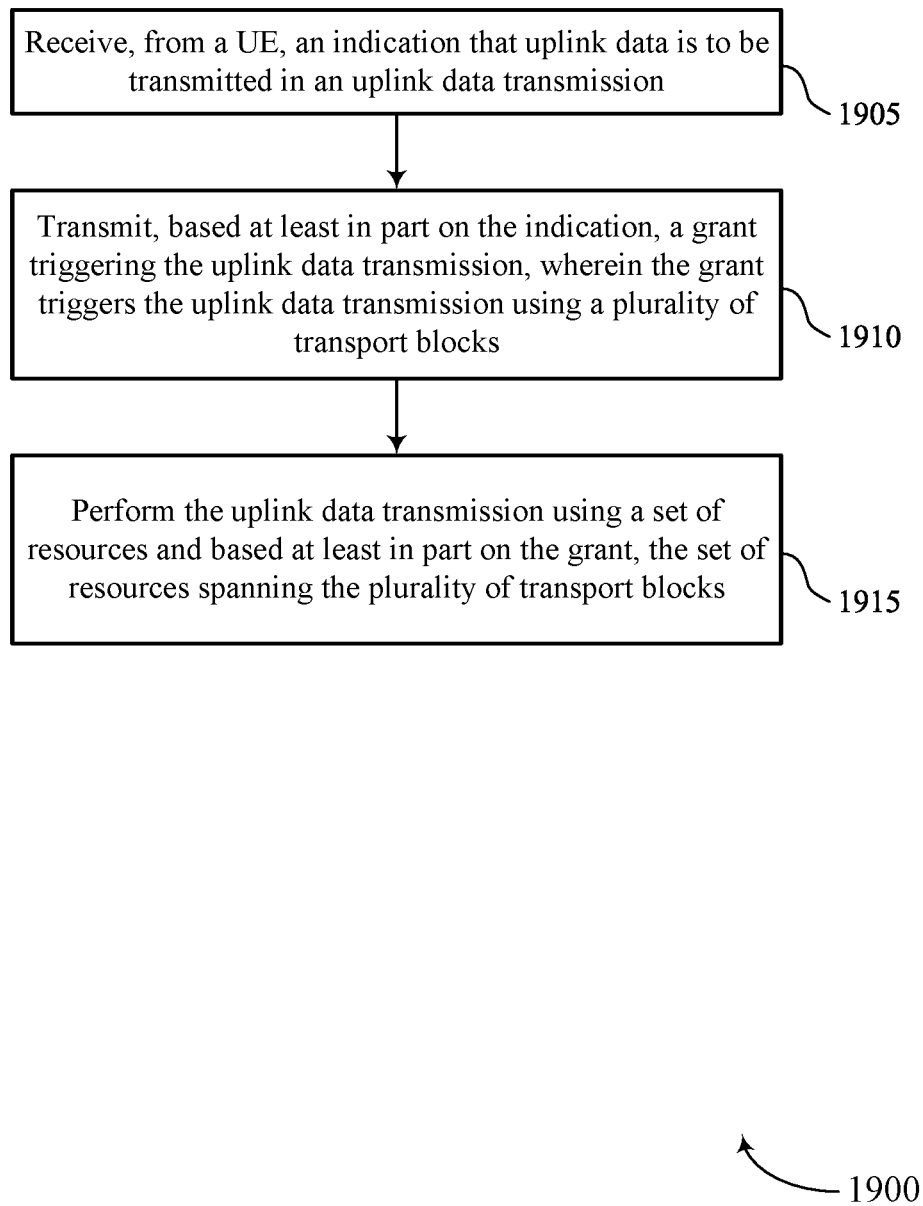

FIG. 19 shows a flowchart illustrating a method 1900 that supports latency reduction and coverage enhancement for extended reality in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include receiving, from a UE, an indication that uplink data is to be transmitted in an uplink data transmission. The operations of 1905 may be performed in accordance with examples as disclosed herein. In some examples, aspects of the operations of 1905 may be performed by a resource manager 1230 as described with reference to FIG. 12.

At 1910, the method may include transmitting, based on the indication, a grant triggering the uplink data transmission, where the grant triggers the uplink data transmission using a set of multiple transport blocks. The operations of 1910 may be performed in accordance with examples as disclosed herein. In some examples, aspects of the operations of 1910 may be performed by an uplink transmission trigger manager 1250 as described with reference to FIG. 12.

At 1915, the method may include performing the uplink data transmission using a set of resources and based on the grant, the set of resources spanning the set of multiple transport blocks. The operations of 1915 may be performed in accordance with examples as disclosed herein. In some examples, aspects of the operations of 1915 may be performed by an uplink transmission manager 1245 as described with reference to FIG. 12.

The following provides an overview of aspects of the present disclosure:

Aspect 1: A method for wireless communication at a UE, comprising: identifying a resource for a joint uplink transmission comprising a SRS and a SR; receiving a grant of a set of resources for an uplink data transmission to a base station; and performing the joint uplink transmission comprising the SRS and the SR using the resource for the joint uplink transmission in connection with performing the uplink data transmission using the set of resources for the uplink data transmission.

Aspect 2: The method of aspect 1, wherein performing the uplink data transmission and the joint uplink transmission comprises: transmitting the uplink data transmission and the joint uplink transmission back-to-back according to a TDM technique and using one or more subcarriers.

Aspect 3: The method of any of aspects 1 through 2, wherein performing the uplink data transmission and the joint uplink transmission comprises: multiplexing the uplink data transmission with the SR to obtain a multiplexed uplink transmission; and transmitting the multiplexed uplink transmission and the SRS back-to-back according to a TDM technique and using one or more subcarriers.

Aspect 4: The method of any of aspects 1 through 3, wherein performing the uplink data transmission and the joint uplink transmission comprises: applying a root sequence, a cyclic shift, or both, for the SRS, wherein the root sequence, the cyclic shift, or both, indicates the SR; and transmitting the uplink data transmission and the SRS back-to-back according to a TDM technique and using one or more subcarriers.

Aspect 5: The method of any of aspects 1 through 4, further comprising: identifying at least one of a repetition pattern, a frequency hopping pattern, a DMRS bundling, or a combination thereof, wherein the uplink data transmission, the joint uplink transmission, or both, are transmitted according to the repetition pattern, the frequency hopping pattern, the DMRS bundling, or a combination thereof.

Aspect 6: The method of any of aspects 1 through 5, further comprising: receiving a signal indicating the resource for the joint uplink transmission.

Aspect 7: The method of aspect 6, wherein the signal comprises at least one of the grant, an RRC signal, a MAC CE, a downlink control information, or a combination thereof.

Aspect 8: A method for wireless communication at a base station, comprising: identifying a resource for a joint uplink transmission comprising a SRS and a SR; transmitting a grant of a set of resources for an uplink data transmission from a UE; and performing the joint uplink transmission comprising the SRS and the SR using the resource for the joint uplink transmission in connection with performing the uplink data transmission using the set of resources for the uplink data transmission.

Aspect 9: The method of aspect 8, wherein performing the uplink data transmission and the joint uplink transmission comprises: receiving the uplink data transmission and the joint uplink transmission back-to-back according to a TDM technique and using one or more subcarriers.

Aspect 10: The method of any of aspects 8 through 9, wherein performing the uplink data transmission and the joint uplink transmission comprises: receiving a multiplexed uplink transmission and the SRS back-to-back according to a TDM technique and using one or more subcarriers, the multiplexed uplink transmission comprising the uplink data transmission multiplexed with the SR.

Aspect 11: The method of any of aspects 8 through 10, wherein performing the uplink data transmission and the joint uplink transmission comprises: receiving the uplink data transmission and the SRS back-to-back according to a TDM technique and using one or more subcarriers; and identifying the SR based at least in part on a root sequence, a cyclic shift, or both, applied to the SRS.

Aspect 12: The method of any of aspects 8 through 11, further comprising: identifying at least one of a repetition pattern, a frequency hopping pattern, a DMRS bundling, or a combination thereof, wherein the uplink data transmission, the joint uplink transmission, or both, are received according to the repetition pattern, the frequency hopping pattern, the DMRS bundling, or a combination thereof.

Aspect 13: The method of any of aspects 8 through 12, further comprising: transmitting a signal indicating the resource for the joint uplink transmission.

Aspect 14: The method of aspect 13, wherein the signal comprises at least one of the grant, an RRC signal, a MAC CE, a downlink control information, or a combination thereof.

Aspect 15: A method for wireless communications at a UE, comprising: receiving a signal indicating a set of resources for an uplink data transmission, the signal further identifying a set of available first parameter values for the uplink data transmission; receiving a grant activating the set of resources for the uplink data transmission, the grant indicating a second parameter value for the uplink data transmission; determining a first parameter value for the uplink data transmission from the set of available first parameter values based at least in part on the second parameter value indicated in the grant; and performing the uplink data transmission using the set of resources and according to the first parameter value and the second parameter value, wherein the first parameter value comprises either a TBS parameter or a slot aggregation factor and the second parameter value comprise either the slot aggregation factor or the TBS parameter.

Aspect 16: The method of aspect 15, wherein the first parameter value comprises the slot aggregation factor and the second parameter value comprises the TBS parameter, further comprising: identifying, based at least in part on the signal, a scaler associated with the TBS parameter; and identifying the slot aggregation factor for the uplink data transmission based at least in part on the scaler and the TBS parameter indicated in the grant.

Aspect 17: The method of any of aspects 15 through 16, wherein the first parameter value comprises the slot aggregation factor and the second parameter value comprises the TBS parameter, further comprising: identifying the slot aggregation factor for the uplink data transmission based at least in part on the TBS parameter indicated in the grant and the set of available first parameter values indicated in the signal.

Aspect 18: The method of any of aspects 15 through 17, wherein the first parameter value comprises the TB S parameter and the second parameter value comprises the slot aggregation factor, further comprising: identifying, based at least in part on the signal, a scaler associated with the slot aggregation factor; and identifying the TBS parameter for the uplink data transmission based at least in part on the scaler and the slot aggregation factor indicated in the grant.

Aspect 19: The method of any of aspects 15 through 18, wherein the first parameter value comprises the TBS parameter and the second parameter value comprises the slot aggregation factor, further comprising: identifying the TBS parameter for the uplink data transmission based at least in part on the slot aggregation factor indicated in the grant and the set of available first parameter values indicated in the signal.

Aspect 20: A method for wireless communications at a base station, comprising: transmitting a signal indicating a set of resources for an uplink data transmission, the signal further identifying a set of available first parameter values for the uplink data transmission; determining a first parameter value for the uplink data transmission from the set of available first parameter values based at least in part on a second parameter value indicated in a grant; transmitting the grant activating the set of resources for the uplink data transmission, the grant indicating the second parameter value for the uplink data transmission; and performing the uplink data transmission using the set of resources and according to the first parameter value and the second parameter value, wherein the first parameter value comprises either a TBS parameter or a slot aggregation factor and the second parameter value comprise either the slot aggregation factor or the TBS parameter.

Aspect 21: The method of aspect 20, wherein the first parameter value comprises the slot aggregation factor and the second parameter value comprises the TBS parameter, further comprising: identifying, based at least in part on the signal, a scaler associated with the TBS parameter; and identifying the slot aggregation factor for the uplink data transmission based at least in part on the scaler and the TBS parameter indicated in the grant.

Aspect 22: The method of any of aspects 20 through 21, wherein the first parameter value comprises the slot aggregation factor and the second parameter value comprises the TBS parameter, further comprising: identifying the slot aggregation factor for the uplink data transmission based at least in part on the TBS parameter indicated in the grant and the set of available first parameter values indicated in the signal.

Aspect 23: The method of any of aspects 20 through 22, wherein the first parameter value comprises the TBS parameter and the second parameter value comprises the slot aggregation factor, further comprising: identifying, based at least in part on the signal, a scaler associated with the slot aggregation factor; and identifying the TBS parameter for the uplink data transmission based at least in part on the scaler and the slot aggregation factor indicated in the grant.

Aspect 24: The method of any of aspects 20 through 23, wherein the first parameter value comprises the TBS parameter and the second parameter value comprises the slot aggregation factor, further comprising: identifying the TBS parameter for the uplink data transmission based at least in part on the slot aggregation factor indicated in the grant and the set of available first parameter values indicated in the signal.

Aspect 25: A method for wireless communications at a UE, comprising: transmitting an indication that uplink data is to be transmitted in an uplink data transmission; receiving, based at least in part on the indication, a grant triggering the uplink data transmission, wherein the grant triggers the uplink data transmission using a plurality of transport blocks; and performing the uplink data transmission using a set of resources and based at least in part on the grant, the set of resources spanning the plurality of transport blocks.

Aspect 26: The method of aspect 25, further comprising: receiving a signal indicating the set of resources spanning the plurality of transport blocks.

Aspect 27: The method of any of aspects 25 through 26, further comprising: identifying the set of resources spanning the plurality of transport blocks based at least in part on the grant.

Aspect 28: The method of any of aspects 25 through 27, further comprising: identifying, based at least in part on the grant, at least one of a repetition pattern, a frequency hopping pattern, a demodulation reference signal bundling, or any combination thereof, wherein the uplink data transmission is performed according to the repetition pattern, the frequency hopping pattern, the demodulation reference signal bundling, or a combination thereof.

Aspect 29: A method for wireless communications at a base station, comprising: receiving, from a UE, an indication that uplink data is to be transmitted in an uplink data transmission; transmitting, based at least in part on the indication, a grant triggering the uplink data transmission, wherein the grant triggers the uplink data transmission using a plurality of transport blocks; and performing the uplink data transmission using a set of resources and based at least in part on the grant, the set of resources spanning the plurality of transport blocks.

Aspect 30: The method of aspect 29, further comprising: transmitting a signal indicating the set of resources spanning the plurality of transport blocks.

Aspect 31: The method of any of aspects 29 through 30, further comprising: identifying the set of resources spanning the plurality of transport blocks based at least in part on the grant.

Aspect 32: The method of any of aspects 29 through 31, further comprising: identifying, based at least in part on the grant, at least one of a repetition pattern, a frequency hopping pattern, a demodulation reference signal bundling, or any combination thereof, wherein the uplink data transmission is performed according to the repetition pattern, the frequency hopping pattern, the demodulation reference signal bundling, or a combination thereof.

Aspect 33: An apparatus for wireless communication at a UE, comprising a processor; memory coupled with the processor; and instructions stored in the memory and executable by the processor to cause the apparatus to perform a method of any of aspects 1 through 7.

Aspect 34: An apparatus for wireless communication at a UE, comprising at least one means for performing a method of any of aspects 1 through 7.

Aspect 35: A non-transitory computer-readable medium storing code for wireless communication at a UE, the code comprising instructions executable by a processor to perform a method of any of aspects 1 through 7.

Aspect 36: An apparatus for wireless communication at a base station, comprising a processor; memory coupled with the processor; and instructions stored in the memory and executable by the processor to cause the apparatus to perform a method of any of aspects 8 through 14.

Aspect 37: An apparatus for wireless communication at a base station, comprising at least one means for performing a method of any of aspects 8 through 14.

Aspect 38: A non-transitory computer-readable medium storing code for wireless communication at a base station, the code comprising instructions executable by a processor to perform a method of any of aspects 8 through 14.

Aspect 39: An apparatus for wireless communications at a UE, comprising a processor; memory coupled with the processor; and instructions stored in the memory and executable by the processor to cause the apparatus to perform a method of any of aspects 15 through 19.

Aspect 40: An apparatus for wireless communications at a UE, comprising at least one means for performing a method of any of aspects 15 through 19.

Aspect 41: A non-transitory computer-readable medium storing code for wireless communications at a UE, the code comprising instructions executable by a processor to perform a method of any of aspects 15 through 19.

Aspect 42: An apparatus for wireless communications at a base station, comprising a processor; memory coupled with the processor; and instructions stored in the memory and executable by the processor to cause the apparatus to perform a method of any of aspects 20 through 24.

Aspect 43: An apparatus for wireless communications at a base station, comprising at least one means for performing a method of any of aspects 20 through 24.

Aspect 44: A non-transitory computer-readable medium storing code for wireless communications at a base station, the code comprising instructions executable by a processor to perform a method of any of aspects 20 through 24.

Aspect 45: An apparatus for wireless communications at a UE, comprising a processor; memory coupled with the processor; and instructions stored in the memory and executable by the processor to cause the apparatus to perform a method of any of aspects 25 through 28.

Aspect 46: An apparatus for wireless communications at a UE, comprising at least one means for performing a method of any of aspects 25 through 28.

Aspect 47: A non-transitory computer-readable medium storing code for wireless communications at a UE, the code comprising instructions executable by a processor to perform a method of any of aspects 25 through 28.

Aspect 48: An apparatus for wireless communications at a base station, comprising a processor; memory coupled with the processor; and instructions stored in the memory and executable by the processor to cause the apparatus to perform a method of any of aspects 29 through 32.

Aspect 49: An apparatus for wireless communications at a base station, comprising at least one means for performing a method of any of aspects 29 through 32.

Aspect 50: A non-transitory computer-readable medium storing code for wireless communications at a base station, the code comprising instructions executable by a processor to perform a method of any of aspects 29 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    performing a first uplink data transmission using a single transport block and a first modulation coding scheme;
    transmitting an indication that uplink data is to be transmitted in a second uplink data transmission;
    receiving, based at least in part on the indication, a grant triggering the second uplink data transmission, wherein the grant triggers the second uplink data transmission using a plurality of transport blocks;
    identifying, based at least in part on the grant, at least one of a repetition pattern, a frequency hopping pattern, a demodulation reference signal bundling, or any combination thereof; and
    performing the second uplink data transmission using a set of resources and a second modulation coding scheme different than the first modulation coding scheme based at least in part on the grant and according to the repetition pattern, the frequency hopping pattern, the demodulation reference signal bundling, or a combination thereof, the set of resources spanning the plurality of transport blocks.

2. The method of claim 1, further comprising:
    receiving a signal indicating the set of resources spanning the plurality of transport blocks and the second modulation coding scheme.

3. The method of claim 1, further comprising:
    identifying the set of resources spanning the plurality of transport blocks based at least in part on the grant.

4. A method for wireless communications at a base station, comprising:
    receiving, from a user equipment (UE), a first uplink data transmission using a single transport block and a first modulation coding scheme;
    receiving, from the UE, an indication that uplink data is to be transmitted in a second uplink data transmission;
    transmitting, based at least in part on the indication, a grant triggering the second uplink data transmission, wherein the grant triggers the second uplink data transmission using a plurality of transport blocks;
    identifying, based at least in part on the grant, at least one of a repetition pattern, a frequency hopping pattern, a demodulation reference signal bundling, or any combination thereof, wherein the second uplink data transmission is performed according to the repetition pattern, the frequency hopping pattern, the demodulation reference signal bundling, or a combination thereof; and
    receiving the second uplink data transmission using a set of resources and a second modulation coding scheme different than the first modulation coding scheme based at least in part on the grant, the set of resources spanning the plurality of transport blocks.

5. The method of claim 4, further comprising:
    transmitting a signal indicating the set of resources spanning the plurality of transport blocks and the second modulation coding scheme.

6. The method of claim 4, further comprising:
    identifying the set of resources spanning the plurality of transport blocks based at least in part on the grant.

7. An apparatus for wireless communications at a user equipment (UE), comprising:
one or more processors; and
one or more memories coupled with the one or more processors and that store executable code that, when executed by the one or more processors, is configured to cause the UE to:
perform a first uplink data transmission using a single transport block and a first modulation coding scheme;
transmit an indication that uplink data is to be transmitted in a second uplink data transmission;
receive, based at least in part on the indication, a grant triggering the second uplink data transmission, wherein the grant triggers the second uplink data transmission using a plurality of transport blocks;
identify, based at least in part on the grant, at least one of a repetition pattern, a frequency hopping pattern, a demodulation reference signal bundling, or any combination thereof; and
perform the second uplink data transmission using a set of resources and a second modulation coding scheme different than the first modulation coding scheme based at least in part on the grant and according to the repetition pattern, the frequency hopping pattern, the demodulation reference signal bundling, or a combination thereof, the set of resources spanning the plurality of transport blocks.

8. The apparatus of claim 7, wherein the executable code is further configured to cause the UE to:
receive a signal indicating the set of resources spanning the plurality of transport blocks and the second modulation coding scheme.

9. The apparatus of claim 7, wherein the executable code is further configured to cause the UE to:
identify the set of resources spanning the plurality of transport blocks based at least in part on the grant.

10. An apparatus for wireless communications at a network entity, comprising:
one or more processors; and
one or more memories coupled with the one or more processors and that store executable code that, when executed by the one or more processors, is configured to cause the network entity to:
receive, from a user equipment (UE), a first uplink data transmission using a single transport block and a first modulation coding scheme;
receive, from the UE, an indication that uplink data is to be transmitted in a second uplink data transmission;
transmit, based at least in part on the indication, a grant triggering the second uplink data transmission, wherein the grant triggers the second uplink data transmission using a plurality of transport blocks;
identify, based at least in part on the grant, at least one of a repetition pattern, a frequency hopping pattern, a demodulation reference signal bundling, or any combination thereof, wherein the second uplink data transmission is performed according to the repetition pattern, the frequency hopping pattern, the demodulation reference signal bundling, or a combination thereof; and
receive the second uplink data transmission using a set of resources and a second modulation coding scheme different than the first modulation coding scheme based at least in part on the grant, the set of resources spanning the plurality of transport blocks.

11. The apparatus of claim 10, wherein the executable code is further configured to cause the network entity to:
transmit a signal indicating the set of resources spanning the plurality of transport blocks and the second modulation coding scheme.

12. The apparatus of claim 10, wherein the executable code is further configured to cause the network entity to:
identify the set of resources spanning the plurality of transport blocks based at least in part on the grant.

13. An apparatus for wireless communications at a user equipment (UE), comprising:
means for performing a first uplink data transmission using a single transport block and a first modulation coding scheme;
means for transmitting an indication that uplink data is to be transmitted in a second uplink data transmission;
means for receiving, based at least in part on the indication, a grant triggering the second uplink data transmission, wherein the grant triggers the second uplink data transmission using a plurality of transport blocks;
means for identifying, based at least in part on the grant, at least one of a repetition pattern, a frequency hopping pattern, a demodulation reference signal bundling, or any combination thereof; and
means for performing the second uplink data transmission using a set of resources and a second modulation coding scheme different than the first modulation coding scheme based at least in part on the grant and according to the repetition pattern, the frequency hopping pattern, the demodulation reference signal bundling, or a combination thereof, the set of resources spanning the plurality of transport blocks.

14. The apparatus of claim 13, further comprising:
means for receiving a signal indicating the set of resources spanning the plurality of transport blocks and the second modulation coding scheme.

15. The apparatus of claim 13, further comprising:
means for identifying the set of resources spanning the plurality of transport blocks based at least in part on the grant.

* * * * *